US009025659B2

(12) United States Patent
Soroushian et al.

(10) Patent No.: US 9,025,659 B2
(45) Date of Patent: *May 5, 2015

(54) SYSTEMS AND METHODS FOR ENCODING MEDIA INCLUDING SUBTITLES FOR ADAPTIVE BITRATE STREAMING

(75) Inventors: Kourosh Soroushian, San Diego, CA (US); Scott Douglas, Ramona, CA (US); Steve Bramwell, San Diego, CA (US); Jason Braness, San Diego, CA (US); Abhishek Shivadas, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/224,298

(22) Filed: Sep. 1, 2011

(65) Prior Publication Data

US 2012/0170643 A1  Jul. 5, 2012

Related U.S. Application Data

(60) Provisional application No. 61/430,110, filed on Jan. 5, 2011.

(51) Int. Cl.
*H04N 7/16* (2011.01)
*H04N 21/6587* (2011.01)
(Continued)

(52) U.S. Cl.
CPC .......... *H04N 21/6587* (2013.01); *G11B 27/005* (2013.01); *G11B 27/11* (2013.01);
(Continued)

(58) Field of Classification Search
CPC .... G11B 27/005; G11B 27/322; G11B 27/11; H04L 65/607; H04L 65/4084; H04L 65/4092; H04N 21/2387; H04N 21/6587; H04N 21/23439; H04N 21/26258; H04N 21/2662; H04N 21/8455; H04N 21/8456; H04N 21/8543; H04N 7/50; H04N 7/26271; H04N 7/26244; H04N 9/8042; H04N 5/85; H04N 21/44209; H04N 21/85406; A61M 3/025; A61M 3/0279; C02F 1/78; C02F 3/12
USPC ..................................................... 375/240.01
See application file for complete search history.

(56) References Cited

U.S. PATENT DOCUMENTS 4,009,331 A  2/1977  Goldmark et al.
(Continued)

FOREIGN PATENT DOCUMENTS

CN  1221284 A  6/1999
(Continued)

OTHER PUBLICATIONS

International Search Report and Written Opinion for International Application PCT/US2011/067167, International Filing Date Dec. 23, 2011, Report Completed Jun. 19, 2012, Mailed Jul. 2, 2012, 11 pgs.
(Continued)

*Primary Examiner* — Andy Rao
*Assistant Examiner* — Shan Elahi
(74) *Attorney, Agent, or Firm* — KPPB LLP

(57) ABSTRACT

Systems and methods for adaptive bitrate streaming of media including subtitles utilizing HTTP in accordance with embodiments of the invention are disclosed. One embodiment of the invention includes selecting a portion of the source media using the source encoder, transcoding the selected portion of the source media into a plurality of alternative portions of encoded video, where each alternative portion is encoded using a different set of encoding parameters and commences with an intra frame at the start of a closed group of pictures (GOP), writing each of the alternative portions of encoded video to a separate container file using the source encoder, writing a subtitle stream segment from each subtitle track corresponding to the selected portion of the source media to a separate container file using the source encoder, and associating a font file with at least one of the container files containing subtitle stream segments.

17 Claims, 14 Drawing Sheets

(51) Int. Cl.
  *G11B 27/00* (2006.01)
  *G11B 27/11* (2006.01)
  *G11B 27/32* (2006.01)
  *H04N 21/2387* (2011.01)
  *H04L 29/06* (2006.01)
  *H04N 21/2343* (2011.01)
  *H04N 21/262* (2011.01)
  *H04N 21/2662* (2011.01)
  *H04N 21/442* (2011.01)
  *H04N 21/845* (2011.01)
  *H04N 21/8543* (2011.01)
  *H04N 21/426* (2011.01)
  *H04N 21/435* (2011.01)
  *H04N 21/44* (2011.01)
  *H04N 21/854* (2011.01)

(52) U.S. Cl.
  CPC ......... *G11B 27/322* (2013.01); *H04N 21/2387* (2013.01); *H04N 21/85406* (2013.01); *H04L 65/4084* (2013.01); *H04L 65/4092* (2013.01); *H04L 65/607* (2013.01); *H04N 21/23439* (2013.01); *H04N 21/26258* (2013.01); *H04N 21/2662* (2013.01); *H04N 21/44209* (2013.01); *H04N 21/8455* (2013.01); *H04N 21/8456* (2013.01); *H04N 21/8543* (2013.01); *H04N 21/42607* (2013.01); *H04N 21/435* (2013.01); *H04N 21/44004* (2013.01); *H04N 21/44008* (2013.01)

(56) References Cited

U.S. PATENT DOCUMENTS

| | | | |
|---|---|---|---|
| 4,694,357 | A | 9/1987 | Rahman et al. |
| 4,802,170 | A | 1/1989 | Trottier |
| 4,964,069 | A | 10/1990 | Ely |
| 5,119,474 | A | 6/1992 | Beitel et al. |
| 5,274,758 | A | 12/1993 | Beitel et al. |
| 5,361,332 | A | 11/1994 | Yoshida et al. |
| 5,396,497 | A | 3/1995 | Veltman |
| 5,404,436 | A * | 4/1995 | Hamilton ............ 345/472 |
| 5,420,801 | A | 5/1995 | Dockter et al. |
| 5,420,974 | A | 5/1995 | Morris et al. |
| 5,471,576 | A | 11/1995 | Yee |
| 5,487,167 | A | 1/1996 | Dinallo et al. |
| 5,533,021 | A | 7/1996 | Branstad et al. |
| 5,537,408 | A | 7/1996 | Branstad et al. |
| 5,539,908 | A | 7/1996 | Chen et al. |
| 5,541,662 | A | 7/1996 | Adams et al. |
| 5,583,652 | A | 12/1996 | Ware |
| 5,627,936 | A | 5/1997 | Prasad |
| 5,633,472 | A | 5/1997 | DeWitt et al. |
| 5,642,171 | A | 6/1997 | Baumgartner et al. |
| 5,655,117 | A | 8/1997 | Goldberg et al. |
| 5,664,044 | A | 9/1997 | Ware |
| 5,675,382 | A | 10/1997 | Bauchspies |
| 5,675,511 | A | 10/1997 | Prasad et al. |
| 5,684,542 | A | 11/1997 | Tsukagoshi |
| 5,719,786 | A | 2/1998 | Nelson et al. |
| 5,745,643 | A | 4/1998 | Mishina |
| 5,751,280 | A | 5/1998 | Abbott et al. |
| 5,763,800 | A | 6/1998 | Rossum et al. |
| 5,765,164 | A | 6/1998 | Prasad et al. |
| 5,794,018 | A | 8/1998 | Vrvilo et al. |
| 5,822,524 | A | 10/1998 | Chen et al. |
| 5,828,370 | A | 10/1998 | Moeller et al. |
| 5,844,575 | A | 12/1998 | Reid |
| 5,848,217 | A | 12/1998 | Tsukagoshi et al. |
| 5,903,261 | A | 5/1999 | Walsh et al. |
| 5,907,597 | A | 5/1999 | Mark |
| 5,956,729 | A | 9/1999 | Goetz et al. |
| 5,959,690 | A | 9/1999 | Toebes, VIII et al. |
| 6,031,622 | A * | 2/2000 | Ristow et al. ............ 358/1.11 |
| 6,046,778 | A | 4/2000 | Nonomura et al. |
| 6,065,050 | A | 5/2000 | DeMoney |
| 6,079,566 | A | 6/2000 | Eleftheriadis et al. |
| 6,169,242 | B1 | 1/2001 | Fay et al. |
| 6,195,388 | B1 | 2/2001 | Choi et al. |
| 6,204,883 | B1 | 3/2001 | Tsukagoshi |
| 6,308,005 | B1 | 10/2001 | Ando et al. |
| 6,330,286 | B1 | 12/2001 | Lyons et al. |
| 6,374,144 | B1 | 4/2002 | Viviani et al. |
| 6,395,969 | B1 | 5/2002 | Fuhrer |
| 6,658,056 | B1 | 12/2003 | Duruöz et al. |
| 6,665,835 | B1 | 12/2003 | Gutfreund et al. |
| 6,671,408 | B1 | 12/2003 | Kaku |
| 6,697,568 | B1 | 2/2004 | Kaku |
| 6,725,281 | B1 | 4/2004 | Zintel et al. |
| 6,807,306 | B1 | 10/2004 | Girgensohn et al. |
| 6,819,394 | B1 | 11/2004 | Nomura et al. |
| 6,856,997 | B2 | 2/2005 | Lee et al. |
| 6,859,496 | B1 | 2/2005 | Boroczky et al. |
| 6,917,652 | B2 | 7/2005 | Lyu |
| 6,944,621 | B1 * | 9/2005 | Collart .................. 1/1 |
| 6,944,629 | B1 | 9/2005 | Shioi et al. |
| 6,956,901 | B2 | 10/2005 | Boroczky et al. |
| 6,985,588 | B1 | 1/2006 | Glick et al. |
| 6,988,144 | B1 | 1/2006 | Luken et al. |
| 7,127,155 | B2 | 10/2006 | Ando et al. |
| 7,209,892 | B1 | 4/2007 | Galuten et al. |
| 7,237,061 | B1 | 6/2007 | Boic |
| 7,242,772 | B1 | 7/2007 | Tehranchi |
| 7,330,875 | B1 | 2/2008 | Parasnis et al. |
| 7,340,528 | B2 * | 3/2008 | Noblecourt et al. ......... 709/231 |
| 7,356,245 | B2 | 4/2008 | Belknap et al. |
| 7,366,788 | B2 | 4/2008 | Jones et al. |
| 7,457,359 | B2 | 11/2008 | Mabey et al. |
| 7,478,325 | B2 * | 1/2009 | Foehr et al. .................. 715/269 |
| 7,493,018 | B2 | 2/2009 | Kim |
| 7,499,938 | B2 * | 3/2009 | Collart .................. 1/1 |
| 7,869,691 | B2 | 1/2011 | Kelly et al. |
| 8,023,562 | B2 | 9/2011 | Zheludkov et al. |
| 8,046,453 | B2 | 10/2011 | Olaiya |
| 8,054,880 | B2 | 11/2011 | Yu et al. |
| 8,225,061 | B2 | 7/2012 | Greenebaum |
| 8,233,768 | B2 | 7/2012 | Soroushian et al. |
| 8,249,168 | B2 | 8/2012 | Graves |
| 8,270,473 | B2 | 9/2012 | Chen et al. |
| 8,270,819 | B2 | 9/2012 | Vannier |
| 8,289,338 | B2 * | 10/2012 | Priyadarshi et al. ......... 345/551 |
| 8,311,115 | B2 | 11/2012 | Gu et al. |
| 8,321,556 | B1 * | 11/2012 | Chatterjee et al. ........... 709/224 |
| 8,386,621 | B2 | 2/2013 | Park |
| 8,456,380 | B2 * | 6/2013 | Pagan ............ 345/2.2 |
| 8,472,792 | B2 * | 6/2013 | Butt et al. ............ 386/345 |
| RE45,052 | E | 7/2014 | Li |
| 8,914,534 | B2 | 12/2014 | Braness et al. |
| 2001/0030710 | A1 | 10/2001 | Werner |
| 2002/0034252 | A1 | 3/2002 | Owen et al. |
| 2002/0051494 | A1 | 5/2002 | Yamaguchi et al. |
| 2002/0062313 | A1 | 5/2002 | Lee et al. |
| 2002/0076112 | A1 | 6/2002 | Devara |
| 2002/0087569 | A1 | 7/2002 | Fischer et al. |
| 2002/0091665 | A1 | 7/2002 | Van Beek et al. |
| 2002/0093571 | A1 | 7/2002 | Hyodo |
| 2002/0110193 | A1 | 8/2002 | Yoo et al. |
| 2002/0118953 | A1 | 8/2002 | Kim |
| 2002/0143413 | A1 | 10/2002 | Fay et al. |
| 2002/0143547 | A1 | 10/2002 | Fay et al. |
| 2002/0147980 | A1 | 10/2002 | Satoda |
| 2002/0161462 | A1 | 10/2002 | Fay et al. |
| 2002/0180929 | A1 | 12/2002 | Tseng et al. |
| 2002/0184159 | A1 | 12/2002 | Tayadon et al. |
| 2002/0191112 | A1 | 12/2002 | Akiyoshi et al. |
| 2002/0191960 | A1 | 12/2002 | Fujinami et al. |
| 2003/0001964 | A1 | 1/2003 | Masukura et al. |
| 2003/0002578 | A1 | 1/2003 | Tsukagoshi et al. |
| 2003/0005442 | A1 | 1/2003 | Brodersen et al. |
| 2003/0035488 | A1 | 2/2003 | Barrau |
| 2003/0078930 | A1 | 4/2003 | Surcouf et al. |
| 2003/0093799 | A1 | 5/2003 | Kauffman et al. |
| 2003/0123855 | A1 | 7/2003 | Okada et al. |

(56) References Cited

U.S. PATENT DOCUMENTS

| | | |
|---|---|---|
| 2003/0128296 A1 | 7/2003 | Lee |
| 2003/0133506 A1 | 7/2003 | Haneda |
| 2003/0152370 A1 | 8/2003 | Otomo et al. |
| 2003/0165328 A1 | 9/2003 | Grecia |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0231863 A1* | 12/2003 | Eerenberg et al. ............. 386/68 |
| 2003/0231867 A1 | 12/2003 | Gates et al. |
| 2003/0236836 A1* | 12/2003 | Borthwick .................. 709/204 |
| 2004/0006701 A1 | 1/2004 | Kresina |
| 2004/0021684 A1 | 2/2004 | Millner |
| 2004/0025180 A1 | 2/2004 | Begeja et al. |
| 2004/0047614 A1 | 3/2004 | Green |
| 2004/0052501 A1 | 3/2004 | Tam |
| 2004/0071453 A1 | 4/2004 | Valderas |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0217971 A1 | 11/2004 | Kim |
| 2004/0255236 A1* | 12/2004 | Collart ...................... 715/500.1 |
| 2005/0015797 A1* | 1/2005 | Noblecourt et al. ............ 725/32 |
| 2005/0038826 A1 | 2/2005 | Bae et al. |
| 2005/0055399 A1 | 3/2005 | Savchuk |
| 2005/0180641 A1 | 8/2005 | Clark |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0207442 A1* | 9/2005 | Zoest et al. .................. 370/465 |
| 2005/0207578 A1 | 9/2005 | Matsuyama et al. |
| 2005/0273695 A1* | 12/2005 | Schnurr ...................... 715/503 |
| 2005/0275656 A1 | 12/2005 | Corbin et al. |
| 2006/0078301 A1 | 4/2006 | Ikeda et al. |
| 2006/0093320 A1 | 5/2006 | Hallberg et al. |
| 2006/0129909 A1* | 6/2006 | Butt et al. .................. 715/500.1 |
| 2006/0168639 A1 | 7/2006 | Gan et al. |
| 2006/0173887 A1 | 8/2006 | Breitfeld et al. |
| 2006/0181965 A1* | 8/2006 | Collart ...................... 369/30.01 |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2007/0031110 A1 | 2/2007 | Rijckaert |
| 2007/0047901 A1* | 3/2007 | Ando et al. ..................... 386/45 |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0180125 A1* | 8/2007 | Knowles et al. ............. 709/227 |
| 2007/0239839 A1 | 10/2007 | Buday et al. |
| 2007/0292107 A1 | 12/2007 | Yahata et al. |
| 2008/0101466 A1 | 5/2008 | Swenson et al. |
| 2008/0104633 A1* | 5/2008 | Noblecourt et al. ............ 725/32 |
| 2008/0120330 A1 | 5/2008 | Reed et al. |
| 2008/0120342 A1 | 5/2008 | Reed et al. |
| 2008/0126248 A1 | 5/2008 | Lee et al. |
| 2008/0137736 A1 | 6/2008 | Richardson et al. |
| 2008/0192818 A1* | 8/2008 | DiPietro et al. .......... 375/240.01 |
| 2008/0256105 A1* | 10/2008 | Nogawa et al. ............... 707/101 |
| 2008/0263354 A1 | 10/2008 | Beuque |
| 2008/0279535 A1 | 11/2008 | Haque et al. |
| 2008/0294691 A1 | 11/2008 | Chang et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0293116 A1 | 11/2009 | Demello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0040351 A1 | 2/2010 | Toma et al. |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0158109 A1 | 6/2010 | Dahlby et al. |
| 2010/0189183 A1 | 7/2010 | Gu et al. |
| 2010/0228795 A1 | 9/2010 | Hahn |
| 2011/0055585 A1* | 3/2011 | Lee ............................. 713/183 |
| 2011/0080940 A1 | 4/2011 | Bocharov |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0150100 A1 | 6/2011 | Abadir |
| 2011/0153785 A1 | 6/2011 | Minborg et al. |
| 2011/0239078 A1 | 9/2011 | Luby et al. |
| 2011/0246659 A1 | 10/2011 | Bouazizi |
| 2011/0268178 A1 | 11/2011 | Park et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0278496 A1 | 11/2012 | Hsu |
| 2012/0307883 A1 | 12/2012 | Graves |
| 2013/0044821 A1 | 2/2013 | Braness et al. |
| 2013/0046902 A1 | 2/2013 | Villegas Nuñez et al. |
| 2013/0055084 A1 | 2/2013 | Soroushian et al. |
| 2013/0061045 A1 | 3/2013 | Kiefer et al. |
| 2013/0196292 A1 | 8/2013 | Brennen et al. |
| 2014/0211840 A1 | 7/2014 | Butt et al. |
| 2014/0250473 A1 | 9/2014 | Braness et al. |

FOREIGN PATENT DOCUMENTS

| | | | |
|---|---|---|---|
| CN | 1723696 | 1/2006 | |
| EP | 757484 A2 | 2/1997 | |
| EP | 813167 A2 * | 12/1997 | ............... G06T 9/00 |
| EP | 1420580 A1 | 5/2004 | |
| EP | 1718074 A1 | 11/2006 | |
| JP | 1996163488 | 6/1996 | |
| JP | 08287613 A | 11/1996 | |
| JP | 11328929 A | 11/1999 | |
| JP | 02001043668 A | 2/2001 | |
| JP | 2002170363 A | 6/2002 | |
| JP | 2002218384 A | 8/2002 | |
| JP | 2003250113 A | 9/2003 | |
| JP | 2005027153 | 1/2005 | |
| KR | 100221423 B1 | 6/1999 | |
| KR | 2002013664 | 2/2002 | |
| KR | 1020020064888 A | 8/2002 | |
| WO | 9515660 A1 | 6/1995 | |
| WO | 0131497 A1 | 5/2001 | |
| WO | 0150732 A2 | 7/2001 | |
| WO | 0201880 A1 | 1/2002 | |
| WO | 2004054247 A1 | 6/2004 | |
| WO | 2004097811 A1 | 11/2004 | |
| WO | 2004102571 A1 | 11/2004 | |
| WO | 2009065137 A1 | 5/2009 | |
| WO | 2010060106 A1 | 5/2010 | |
| WO | 2010122447 A1 | 10/2010 | |

(56) References Cited

FOREIGN PATENT DOCUMENTS

| WO | 2012/094181 | 7/2012 |
|---|---|---|
| WO | 2012/094189 | 7/2012 |
| WO | 2012094171 | 7/2012 |

OTHER PUBLICATIONS

International Search Report and Written Opinion for International Application PCT/US2011/066927, completed Apr. 3, 2012, 14 pgs.
Anonymous, "Method for the Encoding of a Compressed Video Sequence Derived from the Same Video Sequence Compressed at a Different Bit Rate Without Loss of Data", ip.com, ip.com No. IPCOM000008165D, May 22, 2012, pp. 1-9.
Zambelli, Alex, "IIS Smooth Streaming Technical Overview", Microsoft Corporation, Mar. 2009.
"OpenDML AVI File Format Extensions," Sep. 1997, Version 1.02, XP-002179318, OpenDML AVI M-JPEG File Format Subcommitee, 42 pgs.
Author Unknown, AVI RIFF File Reference (Direct X 8.1 C++ Archive), printed from http://msdn.microsoft.com/archive/en-us/dx81_c/directx_cpp/htm/avirifffilereference.asp?fr . . . on Mar. 6, 2006, 7 pgs.
Author Unknown, "Entropy and Source Coding (Compression)," pp. 1-22, TCOM 570, 1999, USA.
Author Unknown, "MPEG-4 Video Encoder: Based on International Standard ISO/IED 14496-2," pp. 1-15, Patni Computer Systems, Ltd., publication date unknown, USA, 2004.
Broadq—The Ultimate Home Entertainment Software, printed May 11, 2009 from itttp://web.srchive.org/web/20030401122010/www.broadq.com/qcasttuned, 1 pg.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
International Search Report and Written Opinion for International Application No. PCT/US2008/083816, completed Jan. 10, 2009, mailed Jan. 22, 2009, 7 pgs.
International Search Report and Written Opinion for International Application No. PCT/US2004/041667, International Filing Date Dec. 8, 204, Search Completed May 24, 2007, Mailed Jun. 20, 2007, 6 pgs.
International Search Report and Written Opinion for International Application No. PCT/US 09/46588, date completed Jul. 14, 2009, date mailed Jul. 23, 2009, 7 pgs.
ITS International, "Fleet System Opts for Mobile Server", Aug. 26, 1999, 1 page.
Linksys, KISS DP-500, printed May 4, 2007 from http://www.kiss-technology.com/?p=dp500, 10 KISS Players , 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys®, "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout &cid=1115416830950&p.
Microsoft Corporation, "Chapter 8, Multimedia File Formats" 1991, Microsoft Windows Multimedia Programmer's Reference, 3 cover pgs, pp. 8-1 to 8-20.
Microsoft Windows® XP Media Center Edition 2005, Frequently asked Questions, printed May 4, 2007 from http://www.microsoft.com/windowsxp/mediacenter/evaluation/faq.mspx, 6 pgs.
Microsoft Windows® XP Media Center Edition 2005: Features, printed May 9, 2007, from http://www.microsoft.com/windowsxp/mediacenter/evaluation/features.mspx, 4 pgs.
Microsoft, Microsoft Media Platform: Player Framework, "Silverlight Media Framework v1.1", 2 pages, 2010.
Microsoft, Microsoft Media Platform: Player Framework, "Microsoft Media Platform: Player Framework v2.5 (formerly Silverlight Media Framework)", 2 pages, 2013.
Morrison, "EA IFF 85" Standard for Interchange Format Files, Jan. 14, 1985, printed from http://www.dcs.ed.ac.uk/home/mxr/gfx/2d/IFF.txt on Mar. 6, 2006, 24 pgs.
Open DML AVI-M-JPEG File Format Subcommittee, "Open DML AVI File Format Extensions", Version 1.02, Feb. 28, 1996, 29 pgs.
PC world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php, 1 pg.
Supplementary European Search Report for Application No. EP 04813918, Search Completed Dec. 19, 2002, 3 pgs.
Taxan, AVel LinkPlayer2 for Consumer, I-O Data USA—Products—Home Entertainment, printed May 4, 2007 from http://www.iodata.com/usa/products/products.php?cat=HNP&sc=AVEL &pld=AVLP2/DVDLA&ts=2&tsc, 1 pg.
The Official Microsoft IIS Site, Smooth Streaming Client, 4 pages, 2014.
Griffith, Eric, Wi-Fi Planet, The Wireless Digital Picture Frame Arrives, printed May 4, 2007 from http://www.wi-fiplanet.com/news/article.php/3093141, 3 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005 from http://download.microsoft.com/download/c/9/a/c9a7000a-66b3-455b-860b-1c16f2eecfec/MCE.pdf, 2 pgs.
I-O Data, Innovation of technology arrived, from http://www.iodata.com/catalogs/AVLP2DVDLA_Flyer200505.pdf, 2 pgs, 2005.
"Adaptive Streaming Comparison", Jan. 28, 2010, 5 pgs.
"Best Practices for Multi-Device Transcoding", Kaltura Open Source Video, 13 pgs, 2011.
"Container format (digital)", printed Aug. 22, 2009 from http://en.wikipedia.org/wiki/Container_format_(digital), 4 pgs.
"DVD-Mpeg differences", http://dvd.sourceforge.net/dvdinfo/dvdmpeg.html, printed on Jul. 2, 2009, 1 pg.
"DVD subtitles", Retrieved from sam.zoy.org/writings/dvd/subtitles, dated Jan. 9, 2001, printed Jul. 2, 2009, 4 pgs.
"Final Committee Draft of MPEG-4 streaming text format", Information Technology—Coding of audio-visual objects—Part 17: Streaming Text Format, International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
InformationWeek: Front End: Daily Dose, "Internet on Wheels", Jul. 20. 1999, 3 pgs.
"Innovation of technology arrived", http://www.iodata.com/catalogs/AVLP2DVDLA_Flyer200505.pdf, I-O Data, 2 pgs.
"Netflix turns on subtitles for PC, Mac streaming", 3 pgs, Apr. 2010.
"OpenDML AVI File Format Extensions", www.the-labs.com/Video/odmlff2-avidef.pdf, Authored by the OpenDML AVI M-JPEG File Format Subcommittee, Sep. 1, 1997.
"QCast Tuner for PS2", printed May 11, 2009 from http://web.archive.org/web/20030210120605/www.divx.com/software/detail.php?ie=39, 2 pgs.
"Supported Media Formats", Android Developers, Nov. 27, 2013, 3 pgs.
Text of ISO/IEC 14496-18/COR1, ITU Study Group 16—Video Coding Experts Group—ISO/IEC MPEG & ITU-T VCEG(ISO/IEC JTC1/SC29/WG11 and ITU-T SG16 06), No. N8664, Nov. 7, 2006.

(56) References Cited

OTHER PUBLICATIONS

Text of ISO/IEC 14496-18/FDIS, ITU Study Group 16—Videocoding Experts Group—ISO/IEC MPEG & ITU-T VCEG(ISO/IEC JTC1/SC29/WG11 and ITU-T SG16 06), No. N6215, Jan. 7, 2004.
"Thread: SSME (Smooth Streaming Medial Element) config.xml review (Smooth Streaming Client configuration file)", 3 pgs, Mar. 2014.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs, Feb. 2014.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
Akhshabi et al., "An Experimental Evaluation of Rate-Adaptation Algorithms in Adaptive Streaming over HTTP", MMSys'11, Feb. 24-25, 2011, 12 pgs.
Casares et al., "Simplifying Video Editing Using Metadata", DIS2002, pp. 157-166.
Darek Blasiak, Ph.D., "Video Transrating and Transcoding: Overview of Video Transrating and Transcoding Technologies,", Ingenient Technologies, Aug. 6, 2002, Houston, TX, USA. pp. 1-22.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages, 2014.
Inlet Technologies, "Adaptive delivery to iPhone 3.0", 2 pgs, 2014.
Inlet Technologies, "HTTP versus RTMP", 3 pages, 2014.
Inlet Technologies, "The World's First Live Smooth Streaming Event: The French Open", 2 pages, Feb. 2010.
Kurzke et al., "Get Your Content Onto Google TV", Google, Retrieved from: http://commondatastorage.googleapis.com/io2012/presentations/live%20to%20website/1300.pdf, 58 pgs, 2012.
Lang, "Expression Encoder, Best Practices for live smooth streaming broadcasting", Microsoft Corporation, 20 pgs, 2010.
Levkov, "Mobile Encoding Guidelines for Android Powered Devices", Adobe Systems Inc., Addendum B, source and date unknown, 42 pgs, 2010.
Long et al., "Silver: Simplifying Video Editing with Metadata", Demonstrations, CHI 2003: New Horizons, pp. 628-629.
MSDN, "Adaptive streaming, Expression Studio 2.0", 2 pgs, 2014.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Noboru, Takematsu, "Play Fast and Fine Video on Web! codec", Co.9 No. 12, Dec. 1, 2003, pp. 178-179.
Noe, Alexander, "AVI File Format", http://www.alexander-noe.com/video/documentation/avi.pdf, pp. 1-26, 2006.
Noe, Alexander, "Definitions", http://www.alexander-noe.com/video/amg/definitions.html, Apr. 11, 2006, 2pgs.
Noé, Alexander, "Matroska File Format (under construction !)", Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Siglin, "HTTP Streaming: What You Need to Know", streamingmedia.com, 2010, 16 pages.
Siglin, "Unifying Global Video Strategies, MP4 File Fragmentation for Broadcast, Mobile and Web Delivery", Nov. 16, 2011, 16 pgs.

\* cited by examiner

SYSTEMS AND METHODS FOR ENCODING MEDIA INCLUDING SUBTITLES FOR ADAPTIVE BITRATE STREAMING

CROSS REFERENCE TO RELATED APPLICATIONS

This application claims priority to U.S. Provisional Application Ser. No. 61/430,110, entitled "Systems and Methods For Adaptive Bitrate Streaming of Media Stored in Matroska Files Using Hypertext Transfer Protocol", filed Jan. 5, 2011, the entirety of which is incorporated herein by reference.

FIELD OF THE INVENTION

The present invention generally relates to adaptive streaming and more specifically to adaptive bitrate streaming of encoded media including subtitles using Hypertext Transfer Protocol.

BACKGROUND

Presentation of textual information can be an important part of the video viewing experience. Text information may be used to represent the movie title, chapter names, specific track data, as well as subtitles. Subtitles may be used for conveying the dialogue of a video presentation in different languages, to aid those with hearing impairments, poor listening comprehension, or to suit the viewer's current listening preferences and at times to present the director or even user commentary in environments where such information is available.

Typically, embedding textual information such as subtitles with audio and video data into multimedia files involves run-length-encoding bitmap images of the subtitle text information. The run-length encoding of bitmaps provides an efficient way of storing the information, and since bitmaps are a pictorial representation of the text rather than a textual representation, there are no additional requirements to render the subtitles, such as utilizing embedded or resident font files. However, despite its advantages, because the text information is stored as bitmaps, it adapts poorly to changes in image frame size and as a result cannot be scaled with acceptable visual results to multiple sizes. In addition to the problem with scalability, bitmap representations are not easily searchable as text, which is an attractive feature from the perspective of categorization, metadata and archival activities.

The use of the actual text with respect to a known alphabet of a particular language to represent the textual information, e.g., a title, chapter names, and/or a dialogue in a movie, is one alternative to using bitmaps to represent the information. Using text in a movie typically requires the encoding of the text in a commonly acceptable representation. ASCII and Unicode are two such representations, where ASCII is typically used for encoding European languages and allows a maximum of 256 symbols, and Unicode is used for representing over 100,000 characters and other symbols from a very comprehensive list of world languages.

Font files are electronic data files containing a set of representations for displaying characters or symbols. There are cases where the font for playing back subtitles may already be present on a playback device. However, often when it comes to foreign languages, or when the look-and-feel of the font is of importance from artistic, aesthetic, or readability purposes, a specific font, which has been tailored to the multimedia presentation, is provided with the multimedia content for use by the playback device. The representations or glyphs in a font file may be made in the form of individual bitmaps, drawing instructions for mathematical formulas for specifying the outline of a character, or instructions on drawing a series of lines with specific sizes and shapes. The advantage of specifying the glyph shape using drawing instructions and mathematical formulas is that the size of the character representation may be scaled to different sizes while generally maintaining their intended shape of the character. A font may also be composed of a mixture of bitmap and non-bitmap glyphs, where bitmap specifications could be used for only depicting certain character sizes.

Some languages, such as Chinese, Japanese, and Korean, utilize a unique symbol for representing each individual word in their corresponding vocabularies. The large number of words making up these different languages leads to very large font files as compared to languages which utilize combination of letters in a unique alphabet to form words. Font files for these languages may be in the 1 to 10 Mbytes range, and can sometimes be as large as 30 Mbytes. While the size of these fonts may not be an issue for processing on a personal computer, in an embedded or a consumer electronic device, such large font sizes may pose a problem especially if the fonts are expected to be dynamically available in memory for the device's rendering engine. When the size of the required representation file exceeds the resource handling capability of an embedded device, the behavior exhibited by these devices and the resulting user-experience may be non-uniform.

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

SUMMARY OF THE INVENTION

Systems and methods for adaptive bitrate streaming of media including subtitles utilizing Hypertext Transfer Protocol (HTTP) in accordance with embodiments of the invention are disclosed. One embodiment of the invention includes selecting a portion of the source media using the source encoder, transcoding the selected portion of the source media into a plurality of alternative portions of encoded video using the source encoder, where each alternative portion is encoded using a different set of encoding parameters and commences with an intra frame at the start of a closed group of pictures (GOP), writing each of the alternative portions of encoded video to a separate container file using the source encoder, writing a subtitle stream segment from each subtitle track corresponding to the selected portion of the source media to a separate container file using the source encoder, and associating a font file with at least one of the container files containing subtitle stream segments.

A further embodiment of the invention includes compressing the font file.

Another embodiment also includes reducing the size of the font file by subsetting the font file, where the subsetted font file includes all of the characters within the subtitle stream segments within the container file with which the font file is associated.

A still further embodiment also includes breaking the font file into a plurality of font files, where at least one of the font files includes characters displayed during a subtitle stream segment.

In still another embodiment, breaking the font file into a plurality of font files includes generating font files corresponding to different subtitle stream segment.

In a yet further embodiment, the plurality of font files is assembled as attachments to a single container file.

In yet another embodiment, starting and ending timecodes are used to indicate a time period over which each font file is used for rendering subtitles.

A further embodiment again also includes generating a union font file using the plurality of font files that includes characters that appear in at least two of the plurality of font files and subsetting the plurality of font files to remove the characters that are in the union font file.

Another embodiment again also includes subsetting each font file so that characters used in a previous subtitle stream segments are removed from the font file.

In a further additional embodiment, the selected portions of source media are selected based upon their duration.

In another additional embodiment, the selected portions of source media each have a duration of two seconds.

In a still yet further embodiment, the container files containing the alternative streams and the subtitle streams are Extensible Binary Markup Language (EBML) container files.

In still yet another embodiment, the element of the EBML container file to which each alternative portion of encoded video is written is a Cluster element, and each Cluster element to which each of the alternative portions of encoded video is written is assigned the same time code.

In a still further embodiment again, the element of the EBML container file to which the subtitle stream segment is written is a Cluster element containing the same time code as the Cluster elements to which the alternative portions of encoded video are written.

Still another embodiment again, also includes creating a top level index file that identifies each of the container files containing the alternative portions of encoded video and identifies the container files that include the at least one subtitle stream.

In a still further additional embodiment, the font file associated with the at least one of the container files containing subtitle stream segments is attached to the container file and the container file includes a separate element containing metadata describing the font file.

In still another additional embodiment, the metadata includes the location of the font file within the container file and information describing the file.

Another further embodiment includes a processor configured by a source encoding application to select a portion of the source media. In addition, the source encoding application further configures the processor to transcode the selected portion of the source media into a plurality of alternative portions of encoded video, where each alternative portion is encoded using a different set of encoding parameters and commences with an intra frame at the start of a closed group of pictures (GOP), write each of the alternative portions of encoded video to a separate container file using the source encoder, write a subtitle stream segment from each subtitle track corresponding to the selected portion of the source media to a separate container file using the source encoder, and associate a font file with at least one of the container files containing subtitle stream segments.

DETAILED DISCLOSURE OF THE INVENTION

Figure 1:
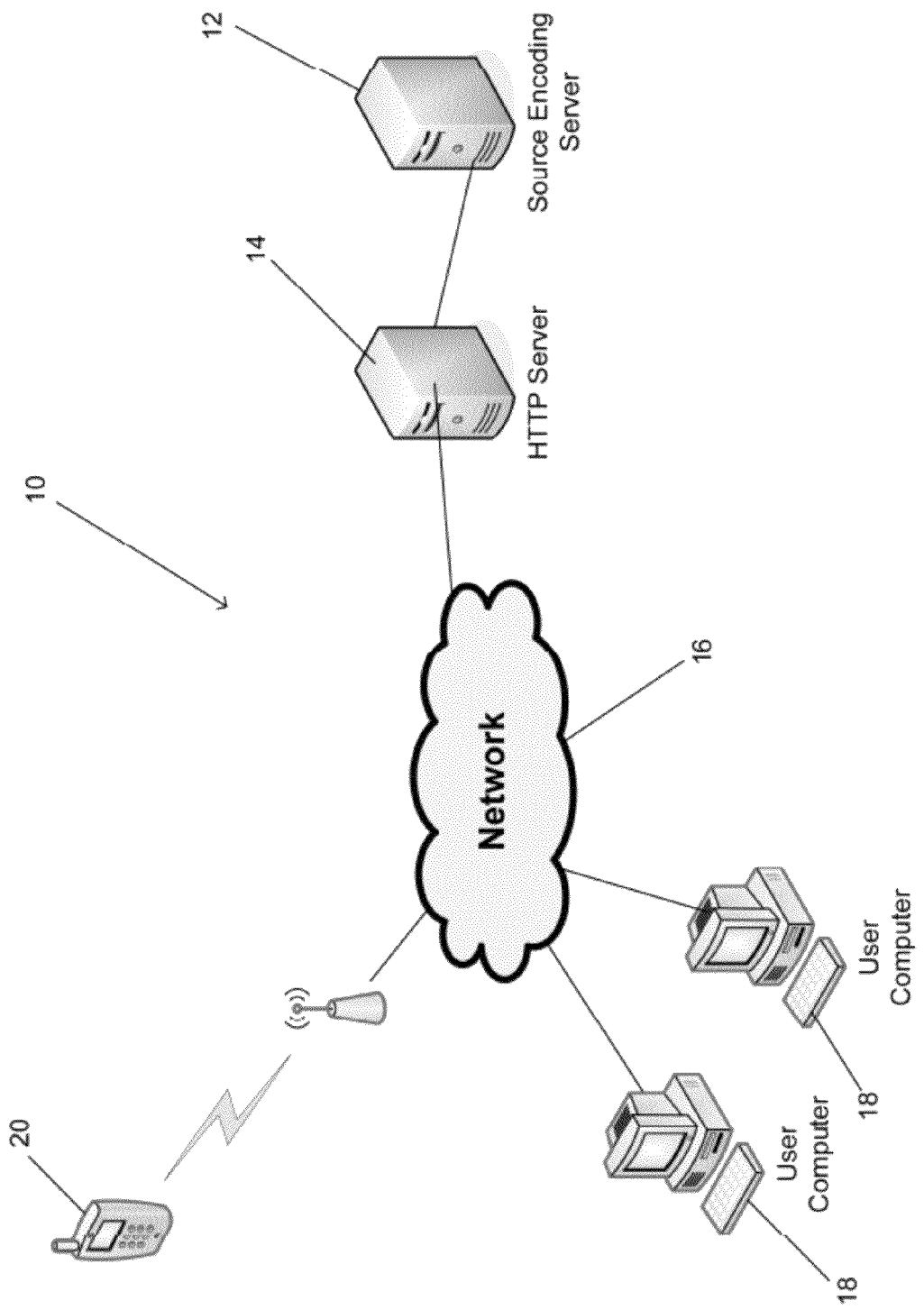
FIG. 1 is a network diagram of an adaptive bitrate streaming system in accordance with an embodiment of the invention.

Turning now to the drawings, systems and methods for adaptive bitrate streaming of media including subtitles utilizing Hypertext Transfer Protocol (HTTP) in accordance with embodiments of the invention are illustrated. In a number of embodiments, subtitle streams are encoded using an encoding such as (but not limited to) Unicode text and playback devices retrieve font files from a remote server when a user requests playback of subtitles that are rendered using a font that is not already present on the device. In a number of embodiments, the font file is subsetted so that it only includes the characters used within the streamed subtitles. In several embodiments, a lossless compression process is applied to the font prior to transmission and the playback device decompresses the received font file prior to utilization by a font-rendering engine on the playback device. The decoding device may query the total size of the font file (whether compressed or uncompressed) and after determining the bandwidth throughput, present a message to the user indicating the total estimated download time. After initiating the actual downloading of the font, the decoding device may present a progress notice indicating the total amount of the font file that has been downloaded, relative to the entire font size. The user may cancel the downloading of the font at any time during the download process, along with an optional message indicating that the selected subtitle cannot be displayed without the availability of the associated font.

In a number of embodiments, source media including one or more sets of subtitles or subtitles tracks synchronized to the video content is encoded as a number of alternative video streams and a separate subtitle stream for each of the sets of subtitles. Each stream is stored in a Matroska (MKV) container file. In many embodiments, the Matroska container file is a specialized Matroska container file in that the manner in which the media in each stream is encoded and stored within the container is constrained to improve streaming performance. A top level index file containing an index to the streams contained within each of the container files is also generated to enable adaptive bitrate streaming of the encoded media. In many embodiments, the top level index file is a Synchronized Multimedia Integration Language (SMIL) file containing URIs for each of the Matroska container files. In other embodiments, any of a variety of file formats can be utilized in the generation of the top level index file.

In a number of embodiments, the font used to render the subtitles in a subtitle stream is included in the container file containing the subtitle stream. In several embodiments, a font file is embedded in a Matroska container file in a manner similar to that described in U.S. patent application Ser. No. 12/480,276 entitled "Systems and Methods for Font File Optimization for Multimedia Files", to Priyadarshi et al., filed Jun. 8, 2009. In many embodiments, the font file is referenced by the top level index file and is stored separately from the container file containing the subtitle that utilizes the font.

The performance of an adaptive bitrate streaming system in accordance with embodiments of the invention can be significantly enhanced by encoding each portion of the source video at each bit rate in such a way that the portion of video is encoded in each stream as a single (or at least one) closed group of pictures (GOP) starting with an Instantaneous Decoder Refresh (IDR) frame. The GOP for each stream can then be stored as a Cluster element within the Matroska container file for the stream. In this way, the playback device can switch between streams at the completion of the playback of a Cluster and, irrespective of the stream from which a Cluster is obtained the first frame in the Cluster will be an IDR frame and can be decoded without reference to any encoded media other than the encoded media contained within the Cluster element. In many embodiments, the sections of the source video that are encoded as GOPs are all the same duration. In a number of embodiments each two second sequence of the source video is encoded as a GOP. The performance of the system can be further improved by subsetting fonts used to render subtitle streams accompanying the source video so that the size of the font files do not exceed the amount of memory that can be allocated to the font-rendering engine of the playback device during playback. In many embodiments, the font file is subsetted based upon the specific characters from the font present in the subtitle stream. In a number of embodiments, multiple font files are provided that each include the characters from a different portion or segment of the subtitle stream.

Retrieval of media using HTTP during adaptive streaming can be improved by adding additional index information to the Matroska container files used to contain each of the encoded streams. In a number of embodiments, the index is a reduced index in that the index only points to the IDRs at the start of each cluster. In many embodiments, the index of the Matroska container file includes additional non-standard attributes (i.e. attributes that do not form part of the Matroska container file format specification) that specify the size of each of the clusters so that a playback device can retrieve a Cluster element from the Matroska container file via HTTP using a byte range request.

Adaptive streaming of source media encoded in the manner outlined above can be coordinated by a playback device in accordance with embodiments of the invention. The playback device obtains information concerning each of the available streams from the top level index file and selects one or more streams to utilize in the playback of the media. The playback device can then obtain header information from the Matroska container files containing the one or more bitstreams or streams, and the headers provide information concerning the decoding of the streams. Where the stream is a subtitle stream, the playback device can determine whether the font utilized by the subtitle stream is present on the playback device and the playback device can request the font file when the font is not present. The playback device can also request index information that indexes the encoded media stored within the relevant Matroska container files. The index information can be stored within the Matroska container files or separately from the Matroska container files in the top level index or in separate index files. The index information enables the playback device to request byte ranges corresponding to Cluster elements within the Matroska container file containing specific portions of encoded media via HTTP from the server. As the playback device receives the Cluster elements from the HTTP server, the playback device can evaluate current streaming conditions to determine whether to increase or decrease the bitrate of the streamed media. In the event that the playback device determines that a change in bitrate is necessary, the playback device can obtain header information and index information for the container file(s) containing the desired alternative stream(s) (assuming the playback device has not already obtained this information). The index information can then be used to identify the byte range of the Cluster element containing the next portion of the source media encoded at the desired bit rate and the identified Cluster element can be retrieved from the server via HTTP. The next portion of the source media that is requested is typically identified based upon the Cluster elements already requested by the playback device and the Cluster elements buffered by the playback device. The next portion of source media requested from the alternative stream is requested to minimize the likelihood that the buffer of the playback device will underflow (i.e. run out media to playback) prior to receipt of the Cluster element containing the next portion of source media by the playback device. In this way, the playback device can achieve adaptive bitrate streaming by retrieving sequential Cluster elements from the various streams as appropriate to the streaming conditions using the top level index and index information describing the Cluster elements within each of the Matroska container files.

In a number of embodiments, variation in the bitrate between different streams of encoded video can be achieved by modifying the encoding parameters for each stream including but not limited to the bitrate, frame rate, and resolution. When different streams include different resolutions, the display aspect ratio of each stream is the same and the sample aspect ratios are modified to ensure smooth transitions from one resolution to another. The encoding of source media including subtitles for use in adaptive bitrate streaming and the playback of the encoded source media using HTTP requests to achieve adaptive bitrate streaming with synchronous display of subtitles in accordance with embodiments of the invention is discussed further below.

Adaptive Streaming System Architecture

An adaptive streaming system in accordance with an embodiment of the invention is illustrated in FIG. 1. The adaptive streaming system 10 includes a source encoder 12 configured to encode source media including one or more subtitle tracks as a number of alternative video streams and a separate subtitle stream for each of the subtitle tracks accompanying the video. Where a font file is provided, the source encoder can store the font file corresponding to each subtitle stream with the subtitle stream and/or can reduce the size of the font file by eliminating characters that do not form part of the subtitle stream from the original font file. In further embodiments, the source encoder generates multiple smaller font files based upon constraints including (but not limited to) memory constraints imposed by playback devices and/or associates the smaller font files with portions of the subtitle stream. In the illustrated embodiment, the source encoder is a server. In other embodiments, the source encoder can be any processing device including a processor and sufficient resources to perform the transcoding of source media (including but not limited to video, audio, and/or subtitles). As is discussed further below, the source encoding server 12 generates a top level index to a plurality of container files containing the streams, at least a plurality of which are alternative video streams and one or more of which are subtitle streams that are synchronized to the video streams. Alternative streams are streams that encode the same media content in different ways. In many instances, alternative streams encode media content (such as but not limited to video) at different bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In many embodiments, the top level index file is a SMIL file and the media is stored in Matroska container files. As is discussed further below, the media can be stored within the Matroska container file in a way that facilitates the adaptive bitrate streaming of the media. In many embodiments, the Matroska container files are specialized Matroska container files that include enhancements (i.e. elements that do not form part of the Matroska file format specification) that facilitate the retrieval of specific portions of media via HTTP during the adaptive bitrate streaming of the media.

In the illustrated embodiment, playback devices include personal computers 18 and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1 any of a variety of architectures can be utilized that enable playback devices to request portions of the top level index file and the container files in accordance with embodiments of the invention.

File Structure

Figure 2:
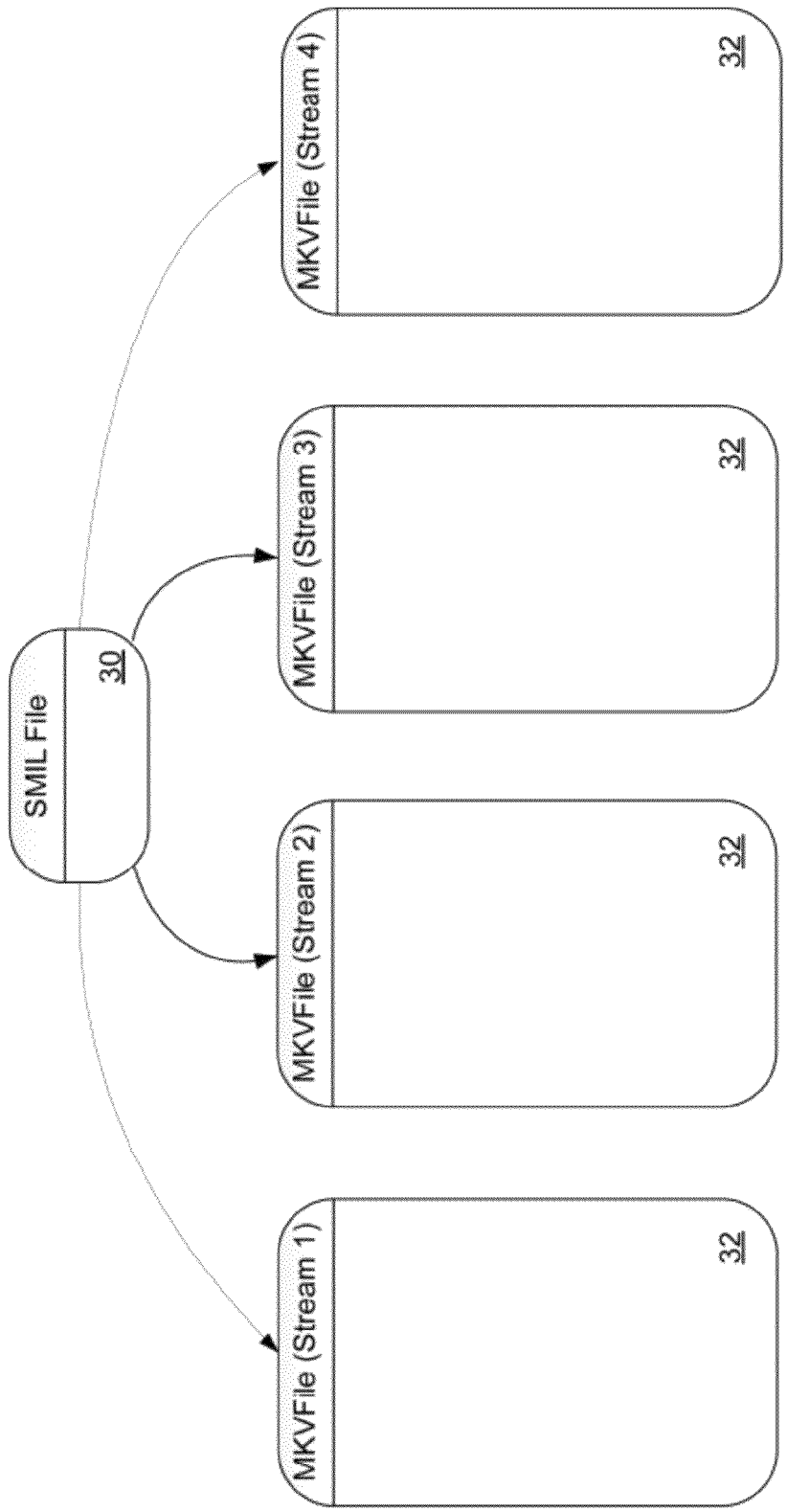
FIG. 2 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 2. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single stream. For example, the stream could be one of a number of alternate video streams, an audio stream, one of a number of alternate audio streams, a subtitle stream, one of a number of alternate subtitle streams, a trick play stream, or one of a number of alternate trick play streams. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

Top Level Index SMIL Files

In a number of embodiments, the top level index file utilized in the adaptive bitrate streaming of media is a SMIL file or dynamically generated SMIL data, which is XML that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams available for use in adaptive bitrate streaming and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is follows:

```
<param
    name="header-request"
    value="1026"
    valuetype="data" />
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data" />
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data" />
```

An example of VIDEO element including the attributes discussed above is as follows:

```
<video
    src="http://cnd.com/video1_620kbps.mkv"
    systemBitrate="620"
    width="480"
    height="270" >
    <param
        name="vbv"
        value="1000"
        valuetype="data" />
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system a VIDEO element that references a trick play track is indicated by the systemProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    systemProfile="DivXPlusTrickTrack"
    width="480"
    height="240">
    <param name="vbv" value="1000" valuetype="data" />
    <param name="header-request" value="1000" valuetype="data" />
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277kbps.mkv"
```

```
    xml:lang="gem"
    <param
        name="reservedBandwidth"
        value="128"
        valuetype="data" />
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
    <param
        name="reservedBandwidth"
        value="32"
        valuetype="data" />
/>
```

In a number of embodiments, the top level index includes a manifest listing all of the available subtitle segments, the time-ranges covered by each segment, and URIs corresponding to the segments. A decoding device can decide which segment to download based on the current time-code, while ensuring that the correct segment is available prior to presenting the associated video and audio. In several embodiments, the top level index includes a manifest listing all of the available font segments, the time-ranges covered by each segment, and a URI corresponding to those segments. In other embodiments, the manifest associated with the segments of the subtitle streams and/or the font file(s) is contained within the container file that contains the subtitle stream. For both fonts and subtitles, the time-range may cover a few seconds, minutes, or the entire duration of the associated audio and video.

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video src="http://cnd.com/video_test1_300kbps.mkv"/>
    <video src="http://cnd.com/video_test2_900kbps.mkv"/>
    <video src="http://cnd.com/video_test3_1200kbps.mkv"/>
</switch>
```

The SWITCH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
        src="http://cnd.com/english-audio.mkv"
        xml:lang="eng"/>
    <audio
        src="http://cnd.com/french-audio.mkv"
        xml:lang="fre"/>
</excl>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil xmlns="http://www.w3.org/ns/SMIL" version="3.0"
baseProfile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240" >
                    <param
                        name="vbv"
                        value="600"
                        valuetype="data" />
                    <param
                        name="header-request"
                        value="1000"
                        valuetype="data" />
                </video>
                <video
                    src="http://cnd.com/video_test2_600kbps.mkv"
                    systemBitrate="600"
                    vbv ="900"
                    width="640"
                    height="480">
                    <param
                        name="vbv"
                        value="1000"
                        valuetype="data" />
                    <param
                        name="header-request"
                        value="1000"
                        valuetype="data" />
                </video>
            </switch>
            <audio
                src="http://cnd.com/audio.mkv"
                xml:lang="eng">
                <param
                    name="header-request"
                    value="1000"
                    valuetype="data" />
                <param name="reservedBandwidth" value="128"
                valuetype="data" />
            </audio>
            <textstream
                src="http://cnd.com/subtitles.mkv"
                xml:lang="eng">
                <param
                    name="header-request"
                    value="1000"
                    valuetype="data" />
                <param name="reservedBandwidth" value="32"
                valuetype="data" />
            </textstream>
```

-continued

```
        </par>
    </body>
</smil>
```

The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. In addition, top level indexes in accordance with embodiments of the invention can provide URIs indicating the location from which a font file can be downloaded. The use of top level index files to enable playback of encoded media using adaptive bitrate streaming in accordance with embodiments of the invention is discussed further below.

Storing Media in Matroska Files for Adaptive Bitrate Streaming

Figure 3:
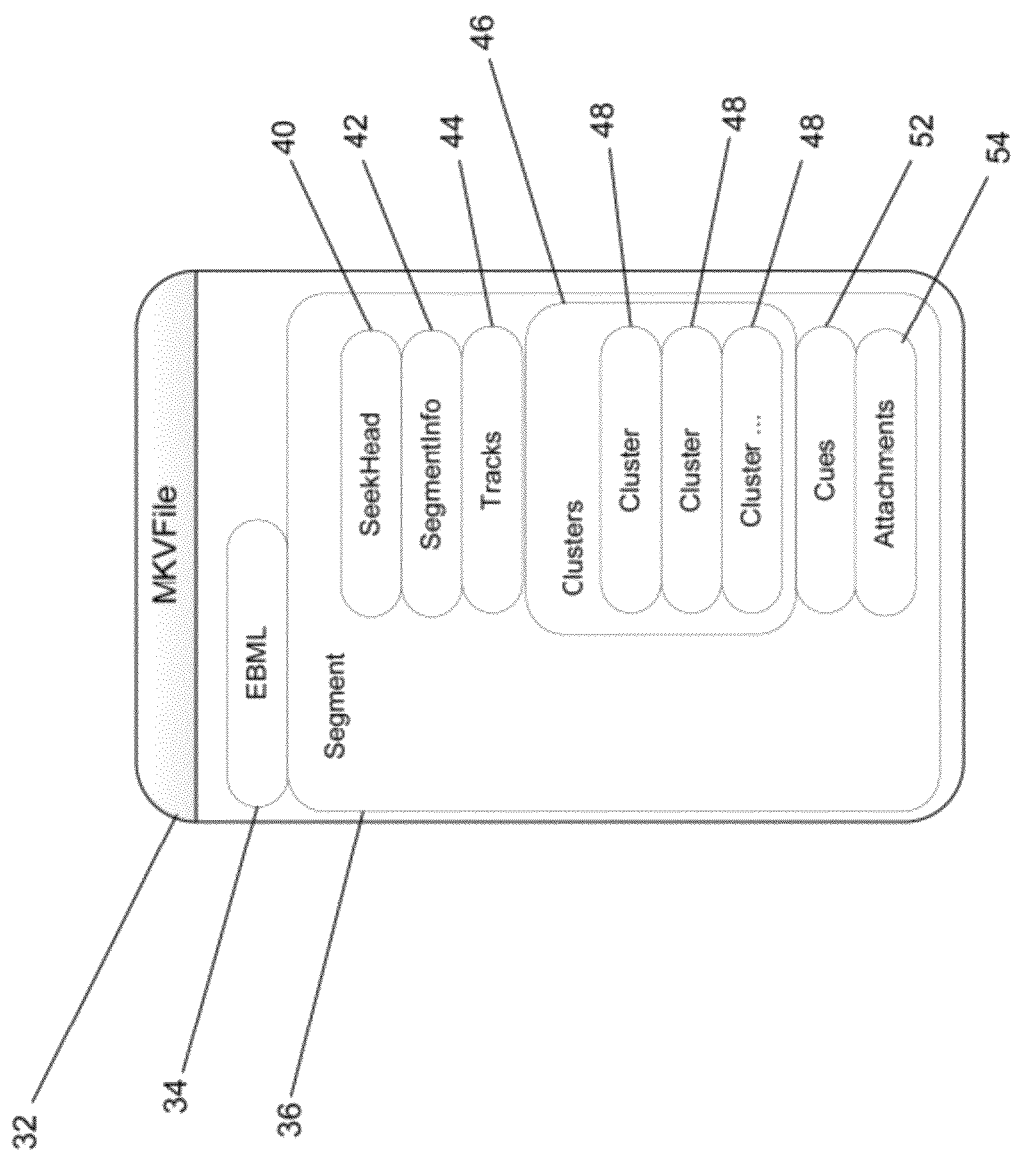
FIG. 3 conceptually illustrates a specialized Matroska container file incorporating a modified Cues element in accordance with an embodiment of the invention.

A Matroska container file used to store encoded video in accordance with an embodiment of the invention is illustrated in FIG. 3. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44. These standard elements describe the media contained within the Matroska container file. The Segment element 36 also includes a standard Clusters element 46. As is described below, the manner in which encoded media is inserted within individual Cluster elements 48 within the Clusters element 46 is constrained to improve the playback of the media in an adaptive streaming system. Where the Matroska container contains encoded video, the constraints imposed upon the encoded video are consistent with the specification of the Matroska container file format and involve encoding the video so that each cluster includes at least one closed GOP commencing with an IDR frame. In addition to the above standard elements, the Segment element 36 also includes a modified version of the standard Cues element 52. As is discussed further below, the Cues element includes specialized CuePoint elements (i.e. non-standard CuePoint elements) that facilitate the retrieval of the media contained within specific Cluster elements via HTTP. In a number of instances, the Matroska file includes an Attachments element 56. In embodiments where one or more font files are included in the container file the font files are contained within the Attachments element.

The constraints imposed upon the encoding of media and the formatting of the encoded media within the Clusters element of a Matroska container file for adaptive bitrate streaming and the additional index information inserted within the container file in accordance with embodiments of the invention is discussed further below.

Encoding Media for Insertion in Cluster Elements

An adaptive bitrate streaming system provides a playback device with the option of selecting between different streams of encoded media during playback according to the streaming conditions experienced by the playback device. In many embodiments, switching between streams is facilitated by separately pre-encoding discrete portions of the source media in accordance with the encoding parameters of each stream and then including each separately encoded portion in its own Cluster element within the stream's container file. Furthermore, the media contained within each cluster is encoded so that the media is capable of playback without reference to media contained in any other cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Figure 4A:
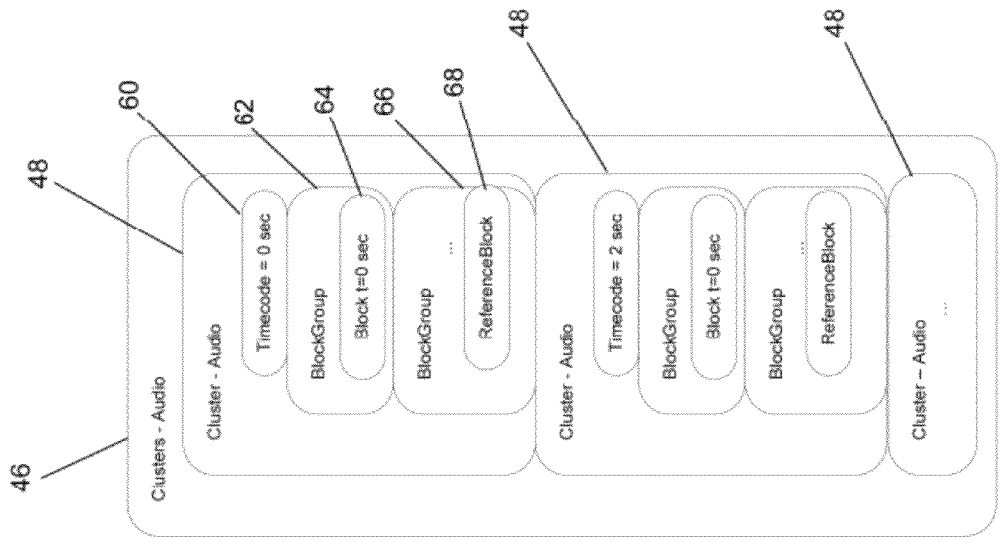
FIGS. 4a-4c conceptually illustrate the insertion of different types of media into the Clusters element of a Matroska container file subject to various constrains that facilitate adaptive bitrate streaming in accordance with embodiments of the invention.

A Clusters element of a Matroska container file containing a video stream in accordance with an embodiment of the invention is illustrated in FIG. 4a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In several embodiments, the encoded video sequences in the Cluster elements have different durations. Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In Many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48. Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup element(s) utilized in the decoding of the frame contained within the BlockGroup or can contain IDR frames and are similar to the first BlockGroup element 62. As noted above, the manner in which encoded video is inserted within the Cluster elements of the Matroska file conforms with the specification of the Matroska file format.

Figure 4B:
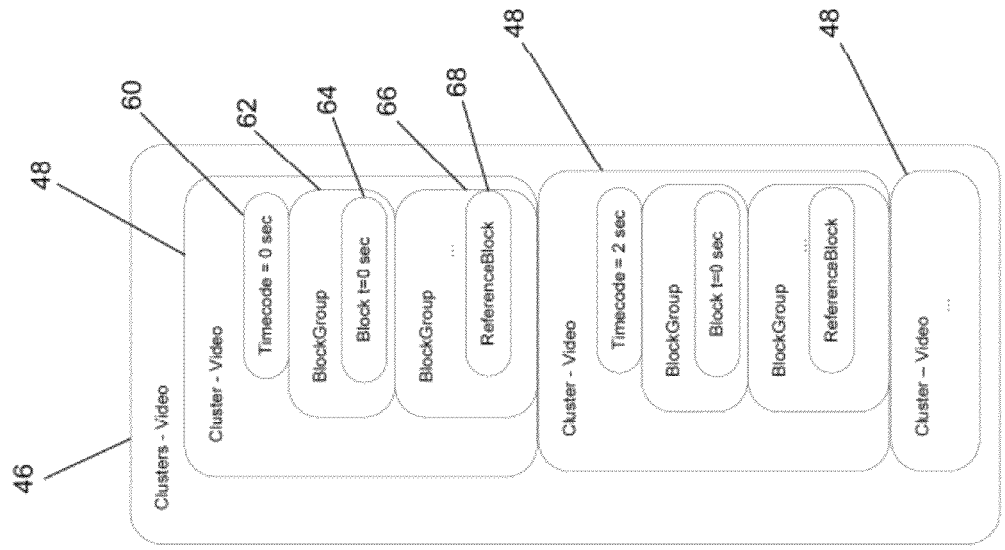
Figure 4D:
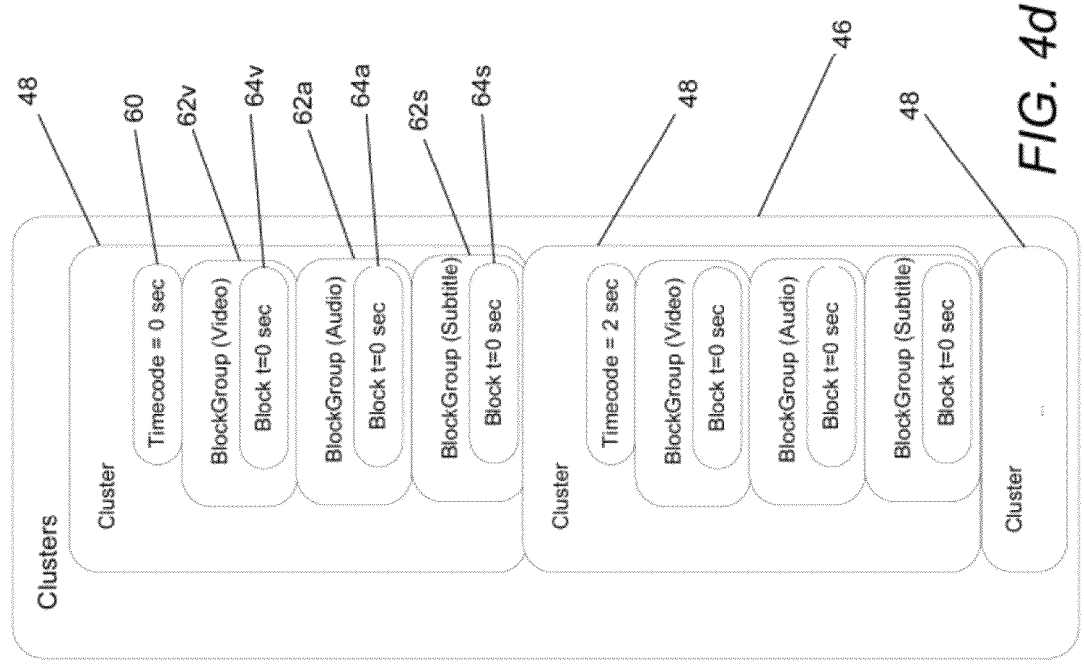
FIG. 4d conceptually illustrates the multiplexing of different types of media into the Clusters element of a Matroska container file subject to various constraints that facilitate adaptive bitrate streaming in accordance with an embodiment of the invention.
Figure 4C:
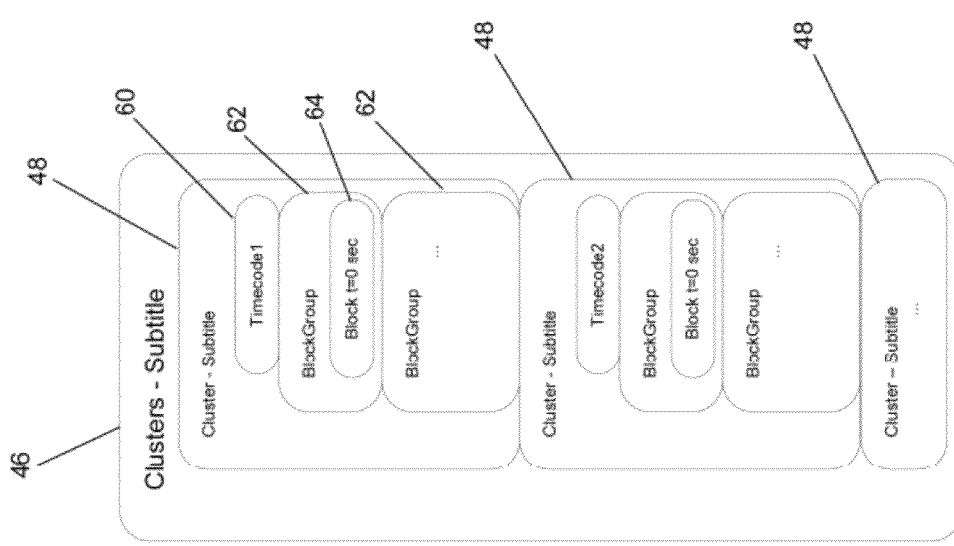

The insertion of encoded audio and subtitle information within a Clusters element 46 of a Matroska container file in accordance with embodiments of the invention is illustrated in FIGS. 4b and 4c. In the illustrated embodiments, the encoded media is inserted within the Cluster elements 48 subject to the same constraints applied to the encoded video discussed above with respect to FIG. 4a. The Cluster elements within the container files containing the audio and/or subtitle streams need not, however, correspond with the start time and duration of the Cluster elements in the container files containing the alternative video streams.

Multiplexing Streams in a Single MKV Container File

The Clusters elements shown in FIGS. 4a-4c assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 4d. In the illustrated embodiment, each Cluster element 48 includes additional BlockGroup elements for each of the multiplexed streams. The first Cluster element includes a first BlockGroup element 62v for encoded video that includes a Block element 64v containing an encoded video frame and indicating the Timecode attribute of the frame relative to the start time of the Cluster element (i.e. the Timecode attribute 60). A second BlockGroup element 62a includes a Block element 64a including an encoded audio sequence and indicating the timecode of the encoded audio relative to the start time of the Cluster element, and a third BlockGroup element 62s including a Block element 64s containing an encoded subtitle and indicating the timecode of the encoded subtitle relative to the start time of the Cluster element. Although not shown in the illustrated embodiment, each Cluster element 48 likely would include additional BlockGroup elements containing additional encoded video, audio or subtitles. Despite the multiplexing of the encoded video, audio, and/or subtitle streams, the same constraints concerning the encoded media apply.

Incorporating Trick Play Tracks in MKV Container Files for Use in Adaptive Bitrate Streaming Systems The incorporation of trick play tracks within Matroska container files is proposed by DivX, LLC in U.S. patent application Ser. No. 12/260,404 entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play track can be encoded that appears to be an accelerated visual search through the source media when played back, when in reality the trick play track is simply a separate track encoding the source media at a lower frame rate. In several embodiments, the tick play stream is created by generating a trick play track in the manner outlined in U.S. patent application Ser. No. 12/260,404 and inserting the trick play track into a Matroska container file subject to the constraints mentioned above with respect to insertion of a video stream into a Matroksa container file. In many embodiments, the trick play track is also subject to the further constraint that every frame in the GOP of each Cluster element in the trick play track is encoded as an IDR frame. As with the other video streams, each Cluster element contains a GOP corresponding to the same two seconds of source media as the corresponding Cluster elements in the other streams. There are simply fewer frames in the GOPs of the trick play track and each frame has a longer duration. In this way, transitions to and from a trick play stream can be treated in the same way as transitions between any of the other encoded streams are treated within an adaptive bitrate streaming system in accordance with embodiments of the invention. Playback of the frames contained within the trick play track to achieve accelerated visual search typically involves the playback device manipulating the timecodes assigned to the frames of encoded video prior to providing the frames to the playback device's decoder to achieve a desired increase in rate of accelerated search (e.g. ×2, ×4, ×6, etc.).

Figure 4E:
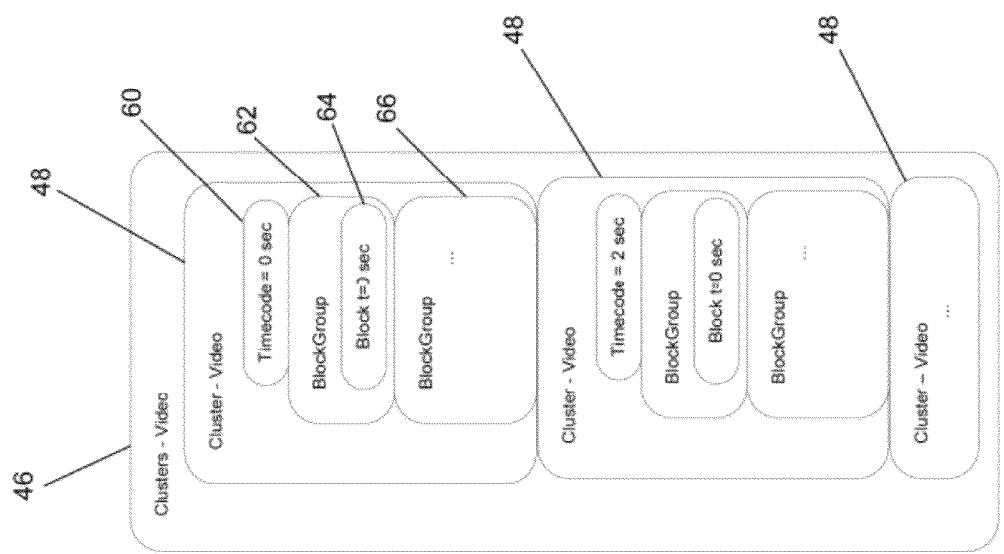
FIG. 4e conceptually illustrates the inclusion of a trick play track into the Clusters element of a Matroska container file subject to various constraints that facilitate adaptive bitrate streaming in accordance with an embodiment of the invention.

A Clusters element containing encoded media from a trick play track is shown in FIG. 4e. In the illustrated embodiment, the encoded trick play track is inserted within the Cluster elements 48 subject to the same constraints applied to the encoded video discussed above with respect to FIG. 4a. However, each Block element contains an IDR. In other embodiments, the Cluster elements within the container files containing the trick play tracks need not correspond with the start time and duration of the Cluster elements in the container files containing the alternative video streams.

In many embodiments, source content can be encoded to provide a single trick play track or multiple trick play tracks for use by the adaptive bit rate streaming system. When a single trick play track is provided, the trick play track is typically encoded at a low bitrate. When multiple alternative trick play tracks are provided, adaptive rate streaming can also be performed with respect to the trick play tracks. In several embodiments, multiple trick play tracks are provided to support different rates of accelerated visual search through the encoded media.

Incorporating Subtitle Streams and Font Files in MKV Containers

The exact representation of subtitles and fonts in any specific multimedia container standard may differ greatly. The Matroska container file format supports subtitles and has provisions for attaching font files and allowing pre-defined elements to specify the association of those attachments with the subtitle stream. Fonts are stored as attachments, and are explicitly associated with a specific subtitle TrackEntry by use of an AttachmentLink element in the TrackEntry that references the Attachment FileUID. The same identification mechanism (AttachmentLink) in a Track element may be repeated multiple times to associate multiple fonts with the Track containing the subtitle data. Additionally, an AttachmentStartTime field and AttachmentEndTime field may be added to the description of each individual attachment (AttachedFile) to denote the start and end times for which a font shall be utilized for the rendering of textual elements of a particular subtitle track. Some embodiments may associate a single font file for use by the movie, where AttachmentStartTime may be set to zero and AttachmentEndTime may be set to the time reflecting the entire duration of the movie. For transmission efficiency, a lossless compression scheme may be applied to font files prior to storage and/or transmission, and the font files can be decompressed by the playback device prior to utilization by a font-rendering engine.

Figure 3A:
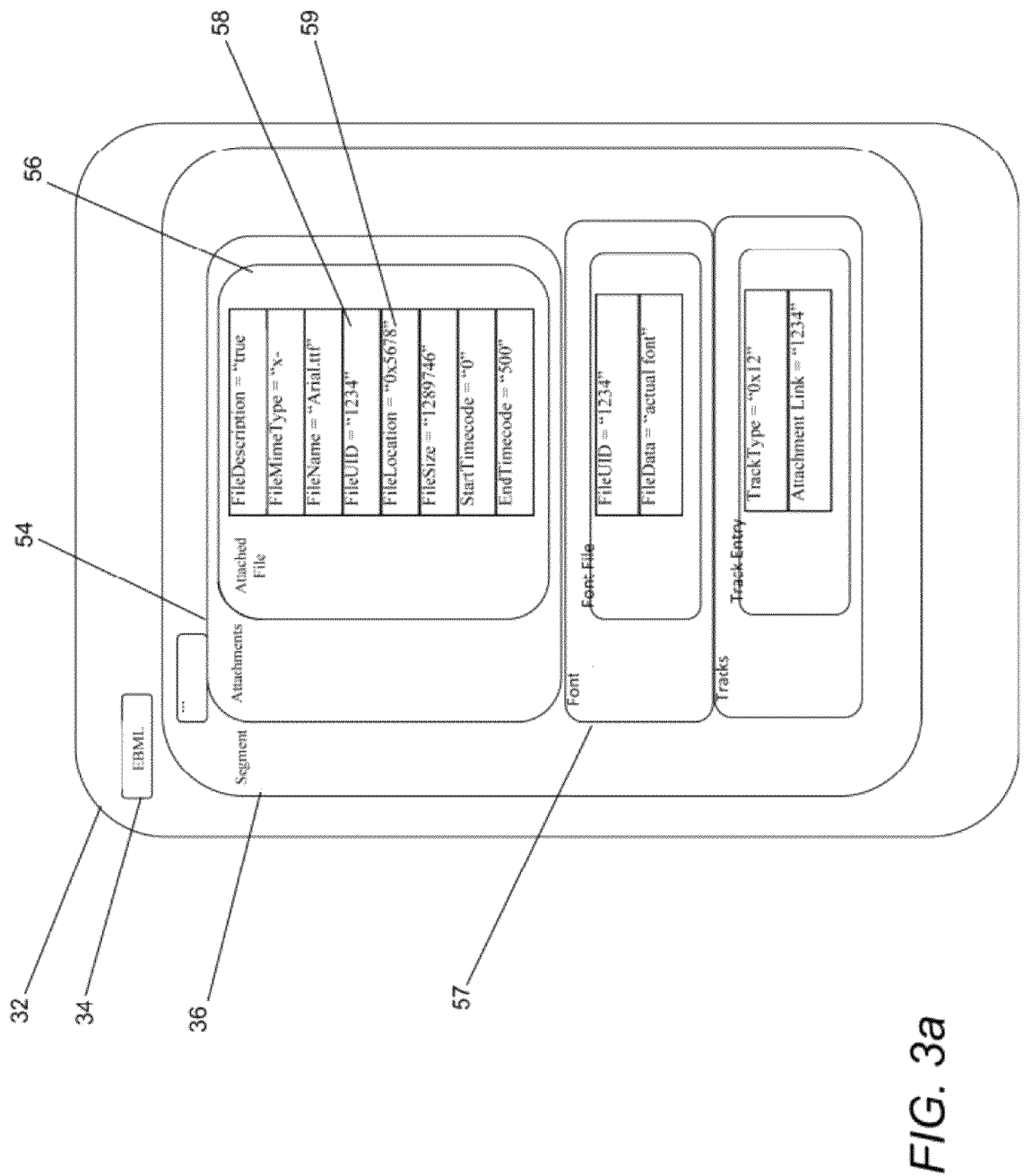
FIG. 3a conceptually illustrates a specialized Matroska container file incorporating a modified Attachments element in which metadata describing a font file is separated from the font file attached to the container file in accordance with an embodiment of the invention.

Typically, subtitle font metadata and one or more associated font files are stored in a Matroska container file under an Attachment tag. The metadata associated with Font Files include (but are not limited to) FileDescription, FileName, FileMimeType, FileData and FileUID. The FileName tag identifies the font type stored within the attachment tag. For example, a FileName ARIALUNI.TTF, identifies the font type stored in the attachment as ARIAL. A parser can determine the FileName from the Attachment tag only after downloading the entire Attachment tag. Downloading attachment tags can be expensive, because the entire font information is present in it. An attachment tag for international language such as Chinese, Japanese and Hindi can be 2 MB and several seconds to downloading causing a significant delay. In the event that the playback device is already possesses the font, the delay can be unnecessary. In several embodiments, a non-standard Matroska file format is used to split the metadata and the font file into separate components. The metadata section can contain metadata used to identify the font file such as (but not limited to) FileDescription, FileMimeType, FileName, FileUID, along with two additional non-standard tags FileLocation, and FileSize. The FileLocation tag can point to the location within the Matroska container file where the font file data is stored and the FileSize is the size of the font file data. By splitting the metadata and actual information, a streaming system can intelligently download the font data only if a particular font is unavailable in its system. A Matroska container file 32 including an Attachments element 54 including a separate AttachedFile element 56 containing metadata pointing to the location of font file data 57 (i.e. the File Location 58 and FileSize attributes 59) within the container file in accordance with an embodiment of the invention is illustrated in FIG. 3a.

As is noted above, the font file can be subsetted to reduce download time and to reduce the amount of memory occupied by the font file once downloaded. Processes for reducing the size of font files based upon the characters from the font utilized in a specific subtitle stream or segment of a subtitle stream are disclosed in U.S. patent application Ser. No. 12/480,276 entitled "Systems and Methods for Font File Optimization for Multimedia Files", to Priyadarshi et al., filed Jun. 8, 2009, which is incorporated by reference above. When a subtitle stream is segmented, the font file associated with that subtitle stream may also be segmented, such that only the characters present in the text for a particular subtitle segment are present in the corresponding font segment. When working with a segmented subtitle file, there will likely be an overlap of characters between the different segments. It is possible to scan all of the segments and determine all characters that overlap between those segments (union operation) and create a special font file that encompasses glyphs for the union of characters in all segments. Once a union font file has been created, subsequent segmented font files may be created as before, though in this case for characters in each segment that do not belong to the union of characters are represented in the segmented font. During playback, the union font file representing the union of characters is streamed first, followed by each subsequent difference or delta font file covering a specific time-range in the presentation, and corresponding to a specific subtitle segment. Start and end timecode indicators in the attachment headers for each font file (FIG. 3a) can be used to determine the time at which a font may be loaded, and the duration for which a file shall remain active. The union font, in this case, may remain active for the duration of the video and audio presentation, and other segments may remain active over the time period corresponding to a specific subtitle segment. The font renderer may be instructed to access glyphs from the union font, together with the font file covering each segment of the subtitle text, according to the start and end timecode values. The top level index may create a special indicator for the union font file, such that the decoding device is made aware of the characteristics of this font file as opposed to the segment font files. When seeking to a section of the encoded video, which has not yet been played, only the new font file associated with the current range (if not already cached) is downloaded as the union font file is already cached.

It is also possible to segment the font files corresponding to each segment of the subtitle stream, such that for each segment, only the glyphs that are not included in the previously transmitted font file segments are included in the font file for the current segment. To render the subtitles, the font render is associated with all font files covering previous sections of the presentation. When seeking to a section of the movie which has not yet been played, all font files from the previous sections are downloaded first prior to playing back subtitles upon resuming from the seek. In this case, the start timecode value of the font files would coincide with the start of a subtitle segment, and the end timecode would coincide with the end of the video and audio presentation. This way, each font file would be used for the entire duration of the corresponding audio and video.

The Matroska standard does not have a specific way of associating other textual elements of the file (such as the movie title or track names) that are not part of the multimedia track hierarchy with a specific font. In one embodiment, with respect to the Matroska specification or format, the association of textual information of the file with an attached font file can be specified in the following manner:

```
+Tags
   +Tag
      +SimpleTag
         TagName=Font
         TagLanguage=jpn
         TagBinary=Subsetted Font
      +Tag
         +SimpleTag
            TagName=SUMMARY
   TagLanguage=jpn
   TagString="a lot of text"
```

In the above description, a subsetted font file is described by a hierarchy of a base Tag element associating a subsetted font with a series of textual elements, which use the existing Matroska Tag mechanism. In this scheme, the font file is described by the first SimpleTag element as shown above, and the actual binary data of the font can be encapsulated as a TagBinary field. The subsequent Tag elements following the first SimpleTag structure can be used to host all the textual elements related to this particular font description. A second Tag element appearing as the immediate child of the parent Tags may be used to host a second font file and associated textual elements, following the same hierarchical structure. Although specific examples are discussed above, any of a variety of techniques can be utilized to incorporate one or more font files within a container file format including (but not limited) to a container file format in accordance with embodiments of the invention that can be requested by a playback device as needed to render a specific subtitle stream.

Incorporating Indexing Information within MKV Container Files

Figure 5:
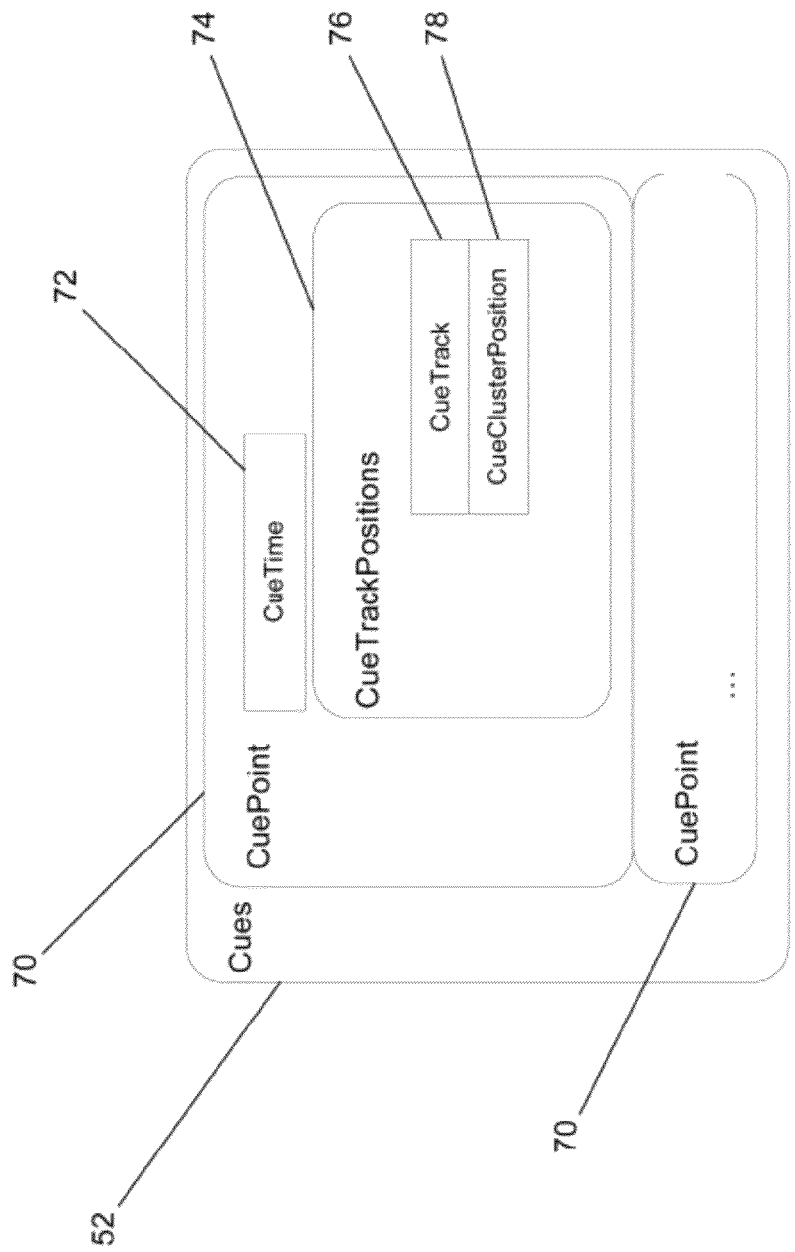
FIG. 5 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional Cues element that is used to index Block elements within the container file. A modified Cues element 52 that can be incorporated into a Matroska container file in accordance with an embodiment of the invention to facilitate the requesting of clusters by a playback device using HTTP is illustrated in FIG. 5. The modified Cues element 52 includes a plurality of CuePoint elements 70 that each include a CueTime attribute 72. Each CuePoint element includes a CueTrackPositions element 74 containing the CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific BlockGroup elements within a Cluster element is required and additional index information is included in the Cues element.

Figure 6:
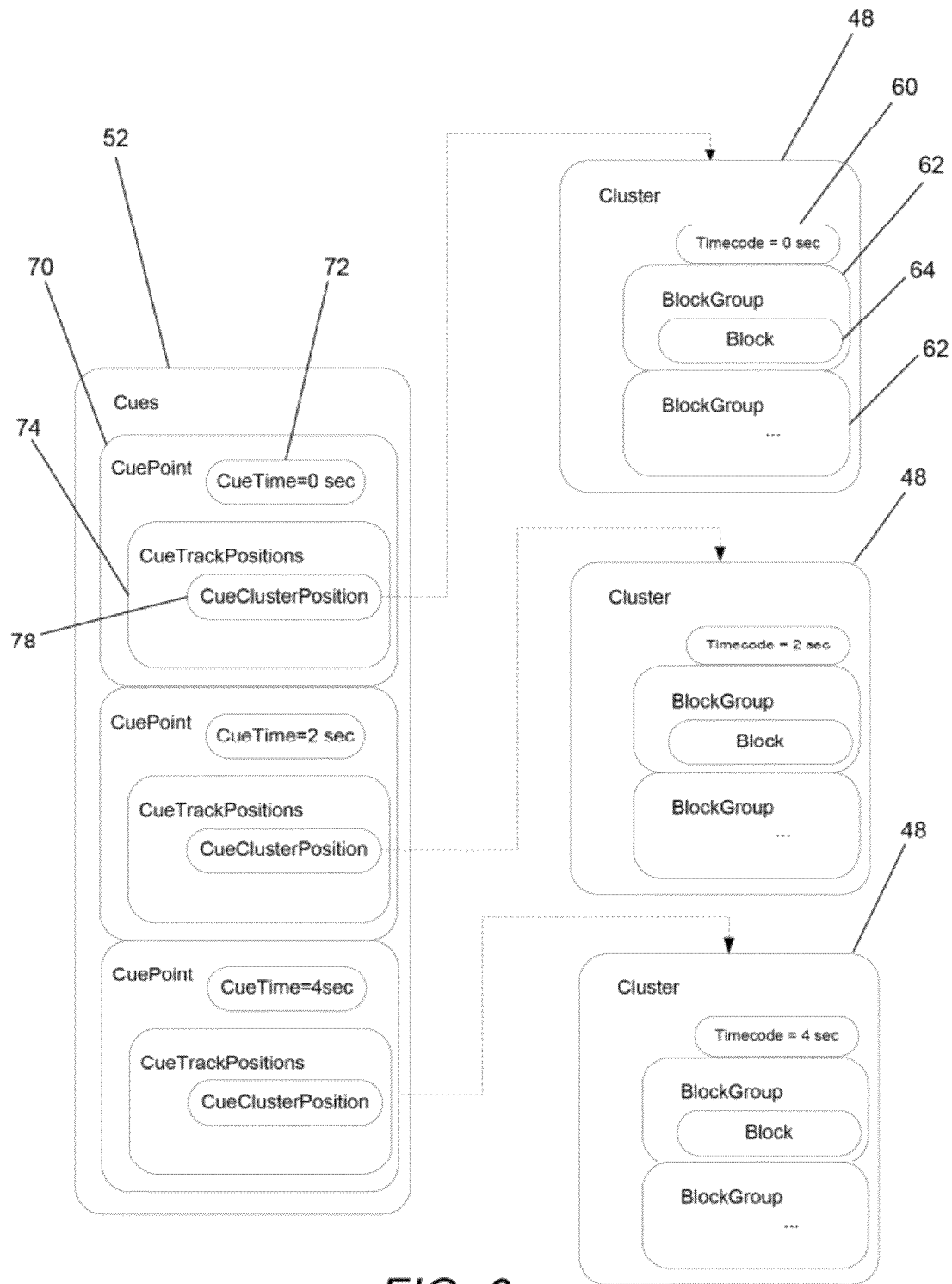
FIG. 6 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 6. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the modified Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional Matroska file does not directly provide a playback device with information concerning the number of bytes to request from the start of the Cluster element in order to obtain all of the encoded video contained within the Cluster element. The size of a Cluster element can be inferred in a modified Cues element by using the CueClusterPosition attribute of the CueTrackPositions element that indexes the first byte of the next Cluster element. Alternatively, additional CueTrackPosition elements could be added to modified Cues elements in accordance with embodiments of the invention that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 5A:
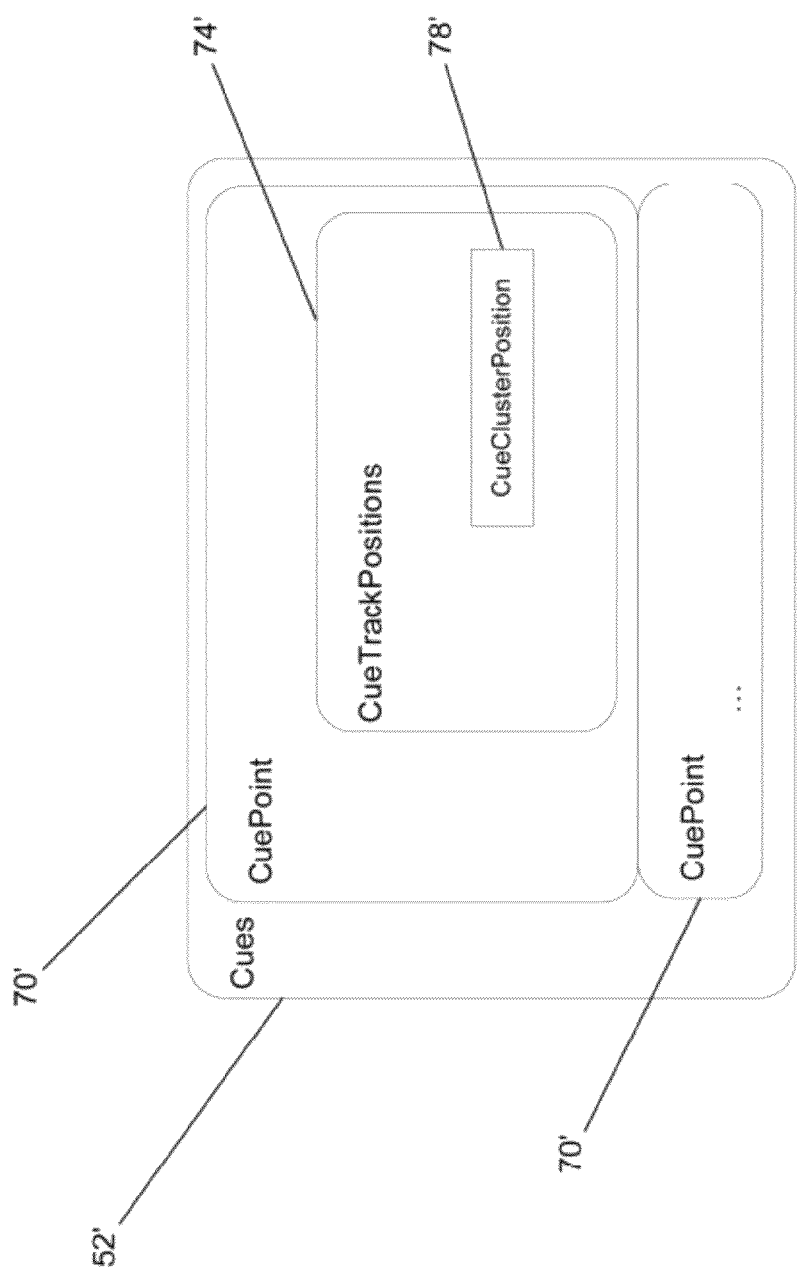
FIG. 5a conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

In some embodiments, a number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded stream in accordance with an embodiment of the invention is illustrated in FIG. 5a. The Cues element 52' shown in FIG. 5a is similar to the Cues element 52 shown in FIG. 5 with the exception that the CuePoint elements 70' do not include a CueTime attribute (see 72 in FIG. 5) and/or the CueTrackPositions elements 74' do not include a CueTrack attribute (76 in FIG. 5). When the portions of encoded media in each Cluster element in the Motroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional Matroska container. In several embodiments, the playback device simply determines the size of Cluster elements on the fly using information obtained from a conventional Cues element, and/or relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Encoding Source Media for Adaptive Bitrate Streaming

Figure 7:
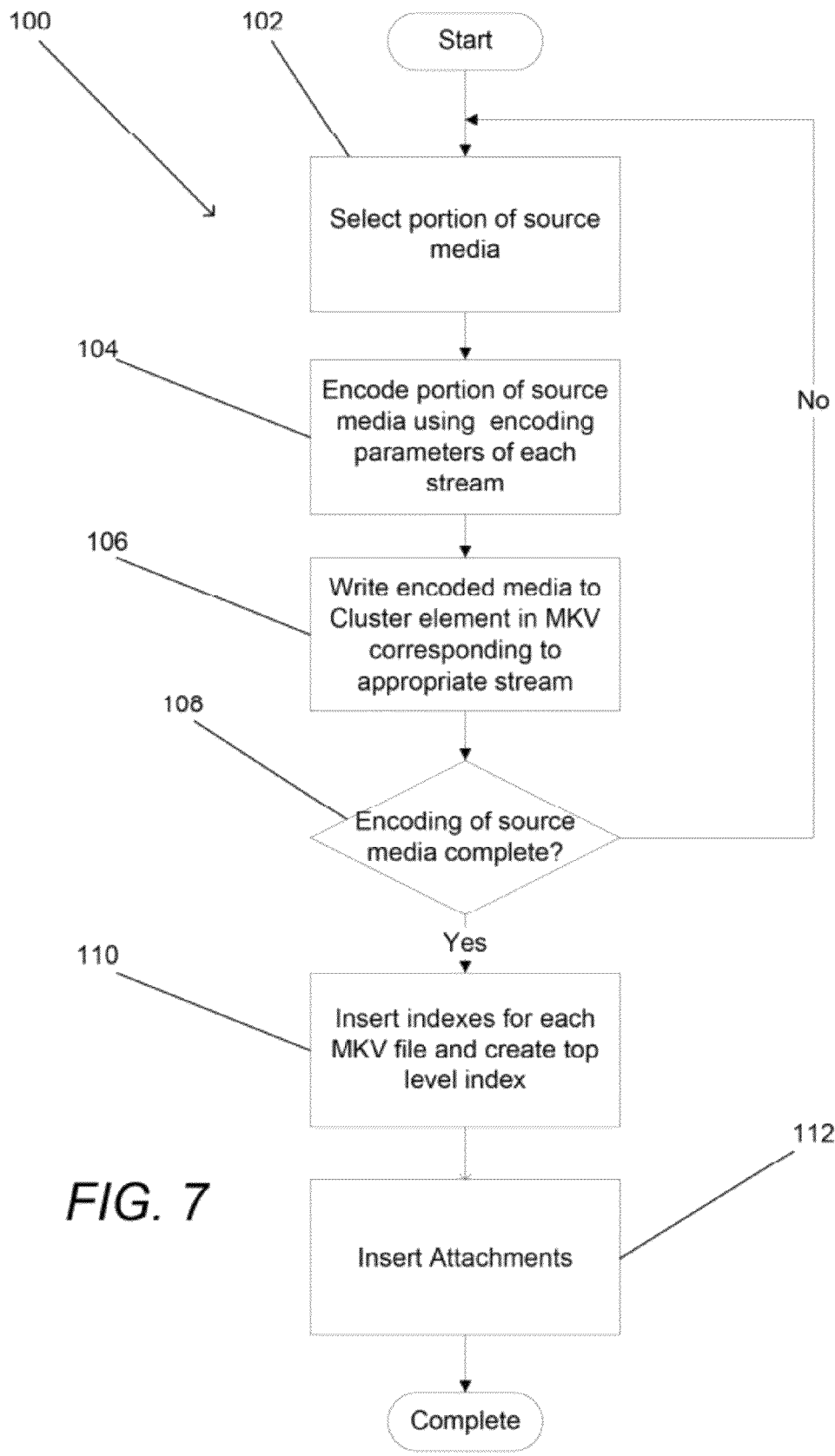
FIG. 7 is a flow chart illustrating a process for encoding source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 7. The encoding process 100 commences by selecting (102) a first portion of the source media and encoding (104) the source media using the encoding parameters for each stream. When the portion of media is video, then the portion of source video is encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate. In many embodiments, the source media is itself encoded and the encoding process (104) involves transcoding or transrating of the encoded source media according to the encoding parameters of each of the alternative streams supported by the adaptive bitrate streaming system.

Once the source media has been encoded as a set of alternative portions of encoded media and one or more subtitle streams, each of the alternative portions of encoded media is inserted (106) into a Cluster element within the Matroska container file corresponding to the stream to which the portion of encoded media belongs. In many embodiments, the encoding process also constructs indexes for each Matroska container file as media is inserted into Cluster elements within the container. Therefore, the process 100 can also include creating a CuePoint element that points to the Cluster element inserted within the Matroska container file. The CuePoint element can be held in a buffer until the source media is completely encoded. Although the above process describes encoding each of the alternative portions of encoded media sequentially in a single pass through the source media, many embodiments of the invention involve performing a separate pass through the source media to encode each of the alternative streams.

Referring back to FIG. 7, the process continues to select (102) and encode (104) portions of the source media and then insert (106) the encoded portions of media into the Matroska container file corresponding to the appropriate stream until the entire source media is encoded for adaptive bitrate streaming (108). At which point, the process can insert an index (110) into the Matroska container for each stream and create (112) a top level index file that indexes each of the encoded streams contained within the Matroska container files. As noted above, the indexes can be created as encoded media and inserted into the Matroska container files so that a CuePoint element indexes each Cluster element within the Mastroska container file. Upon completion of the encoding, each of the CuePoint elements can be included in a Cues element and the Cues element can be inserted into the Matroska container file following the Clusters element. When the source media includes subtitles, the process also includes inserting (114) one or more font files constructed in the manner outlined above into the container file as an attachment.

Following the encoding of the source media to create Matroska container files containing each of the streams generated during the encoding process, which can include the generation of trick play streams, and a top level index file that indexes each of the streams within the Matroska container files, the top level index file and the Matroska container files can be uploaded to an HTTP server for adaptive bitrate streaming to playback devices. The adaptive bitrate streaming of media including subtitles encoded in accordance with embodiments of the invention using HTTP requests is discussed further below.

Adaptive Bitrate Streaming from MKV Container Files Using HTTP

When source media is encoded so that there are alternative streams contained in separate Matroska container files for at least one of video, audio, and subtitle content, adaptive streaming of the media contained within the Matroska container files can be achieved using HTTP requests or a similar stateless data transfer protocol. In many embodiments, a playback device requests the top level index file resident on the server and uses the index information to identify the streams that are available to the playback device. When the playback device receives an instruction to stream subtitles in conjunction with the adaptive bitrate streaming of encoded video, the playback device can retrieve information concerning the font utilized by the subtitle stream from within the container file containing the subtitle stream. In the event that the subtitle is not resident on the playback device, the playback device can request one or more font files associated with the subtitle stream. In several embodiments, the entire subtitle stream and the corresponding font file(s) can be downloaded prior to playback of the encoded video content. In many embodiments, the subtitle stream is segmented and/or the font file(s) are subsetted according to the segment of the subtitle stream with which the font file is associated. In this way, the amount of information that is downloaded by the playback device prior to the presentation of the video and accompanying subtitle stream can be reduced.

The playback device can retrieve the indexes for one or more of the Matroska files and can use the indexes to request media from one or more of the streams contained within the Matroska container files using HTTP requests or using a similar stateless protocol. As noted above, many embodiments of the invention implement the indexes for each of the Matroska container files using a modified Cues element. In a number of embodiments, however, the encoded media for each stream is contained within a standard Matroska container file and separate index file(s) can also be provided for each of the container files. Based upon the streaming conditions experienced by the playback device, the playback device can select media from alternative streams encoded at different bitrates. When the media from each of the streams is inserted into the Matroska container file in the manner outlined above, transitions between streams can occur upon the completion of playback of media within a Cluster element. Therefore, the size of the Cluster elements (i.e. the duration of the encoded media within the Cluster elements) is typically chosen so that the playback device is able to respond quickly enough to changing streaming conditions and to instructions from the user that involve utilization of a trick play track. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In many embodiments, the size of the Cluster elements is chosen so that each Cluster element contains two seconds of encoded media. In other embodiments, the duration of the encoded media can be greater or less than two seconds and/or the duration of the encoded media can vary from Cluster element to Cluster element.

Figure 8:
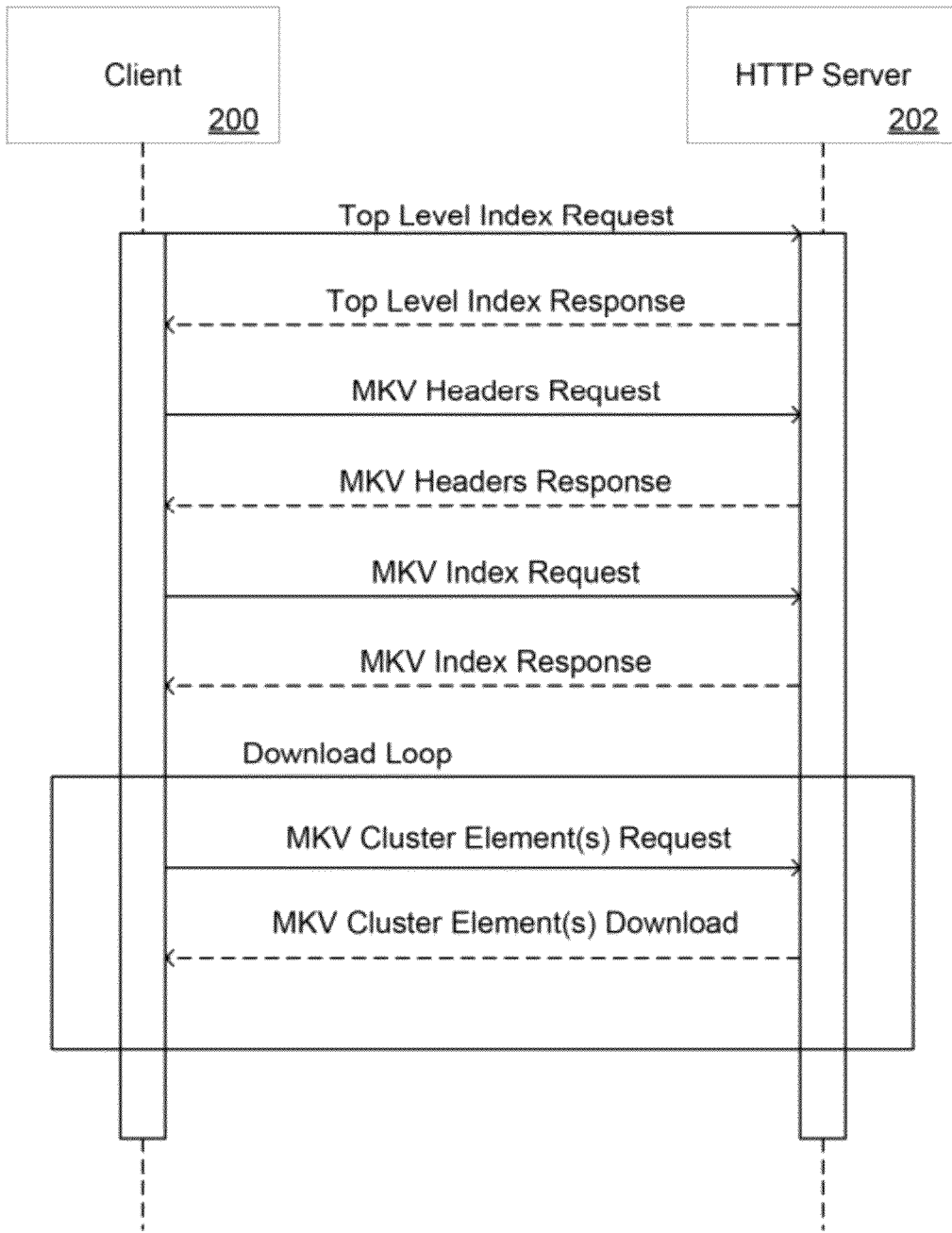
FIG. 8 conceptually illustrates communication between a playback device and an HTTP server associated with the commencement of streaming of encoded media contained within Matroska container files indexed by a top level index file in accordance with an embodiment of the invention.

Communication between a playback device or client and an HTTP server during the playback of media encoded in separate streams contained within Matroska container files indexed by a top level index file in accordance with an embodiment of the invention is illustrated in FIG. 8. In the illustrated embodiment, the playback device 200 commences playback by requesting the top level index file from the server 202 using an HTTP request or a similar protocol for retrieving data. The server 202 provides the bytes corresponding to the request. The playback device 200 then parses the top level index file to identify the URIs of each of the Matroska container files containing the streams of encoded media derived from a specific piece of source media. The playback device can then request the byte ranges corresponding to headers of one or more of the Matroska container files via HTTP or a similar protocol, where the byte ranges are determined using the information contained in the URI for the relevant Matroska container files (see discussion above). The server returns the following information in response to a request for the byte range containing the headers of a Matroska container file:

ELEM("EBML")
ELEM("SEEKHEAD")
ELEM("SEGMENTINFO")
ELEM("TRACKS")

The EBML element is typically processed by the playback device to ensure that the file version is supported. The SeekHead element is parsed to find the location of the Matroska index elements and the SegmentInfo element contains two key elements utilized in playback: TimecodeScale and Duration. The TimecodeScale specifies the timecode scale for all timecodes within the Segment of the Matroska container file and the Duration specifies the duration of the Segment based upon the TimecodeScale. The Tracks element contains the information used by the playback device to decode the encoded media contained within the Clusters element of the Matroska file. When the Matroska container file includes a subtitle stream, the Tracks element can reference one or more font file attachments to the Matroska container file that can be utilized by the font-rendering engine of the playback device. The font files need not be downloaded by the playback device until the specific subtitle stream contained within the container file is requested for playback. At which point the font file(s) downloaded typically depend upon information within the container file relating the font file(s) to the timing of the presentation of the subtitles. In many embodiments, a single font file is provided and the playback device downloads the font file. Where multiple font files are present the playback device downloads the font files associated with the segment of the subtitle stream being requested by the playback device. In a number of embodiments, the playback device downloads a font file associated with the segment of the subtitle stream requested by the playback device. In many embodiments, an initial or union font file is downloaded and any additional font file associated with the segment of the subtitle stream requested by the playback device is also downloaded. In several embodiments, a series of font files is downloaded based upon the timing of the segment of the subtitle stream requested by the playback device relative to the start of the subtitle stream (e.g. every font file associated with the subtitle stream from the start of the subtitle stream up to the requested segment of the playback stream are requested). In a number of embodiments, the playback device presents a display to the user indicating the estimated time remaining to download the font file(s). The user can interrupt the download to commence streaming of the audio and/or video. In the event that the user interrupts downloading of the font file a message can be displayed indicating that the requested subtitle stream will not be available during playback. As noted above, adaptive bitrate streaming systems in accordance with embodiments of the invention can support different streams encoded using different encoding parameters including but not limited to frame rate, and resolution. Therefore, the playback device can use the information contained within the Matroska container file's headers to configure the decoder every time a transition is made between encoded streams.

In many embodiments, the playback device does not retrieve the headers for all of the Matroska container files indexed in the top level index file. Instead, the playback device determines the stream(s) that will be utilized to initially commence playback and requests the headers from the corresponding Matroska container files. Depending upon the structure of the URIs contained within the top level index file, the playback device can either use information from the URIs or information from the headers of the Matroska container files to request byte ranges from the server that contain at least a portion of the index from relevant Matroska container files. The byte ranges can correspond to the entire index. The server provides the relevant byte ranges containing the index information to the playback device, and the playback device can use the index information to request the byte ranges of Cluster elements containing encoded media using this information. When the Cluster elements are received, the playback device can extract encoded media from the Block elements within the Cluster element, and can decode and playback the media within the Block elements in accordance with their associated Timecode attributes.

In the illustrated embodiment, the playback device 200 requests sufficient index information from the HTTP server prior to the commencement of playback that the playback device can stream the entirety of each of the selected streams using the index information. In other embodiments, the playback device continuously retrieves index information as media is played back. In several embodiments, all of the index information for the lowest bitrate steam is requested prior to playback so that the index information for the lowest bitrate stream is available to the playback device in the event that streaming conditions deteriorate rapidly during playback.

Switching Between Streams

The communications illustrated in FIG. 8 assume that the playback device continues to request media from the same streams (i.e. Matroska container files) throughout playback of the media. In reality, the streaming conditions experienced by the playback device are likely to change during the playback of the streaming media and the playback device can request media from alternative streams (i.e. different Matroska container files) to provide the best picture quality for the streaming conditions experienced by the playback device. In addition, the playback device may switch streams in order to perform a trick play function that utilizes a trick play track stream.

Figure 9A:
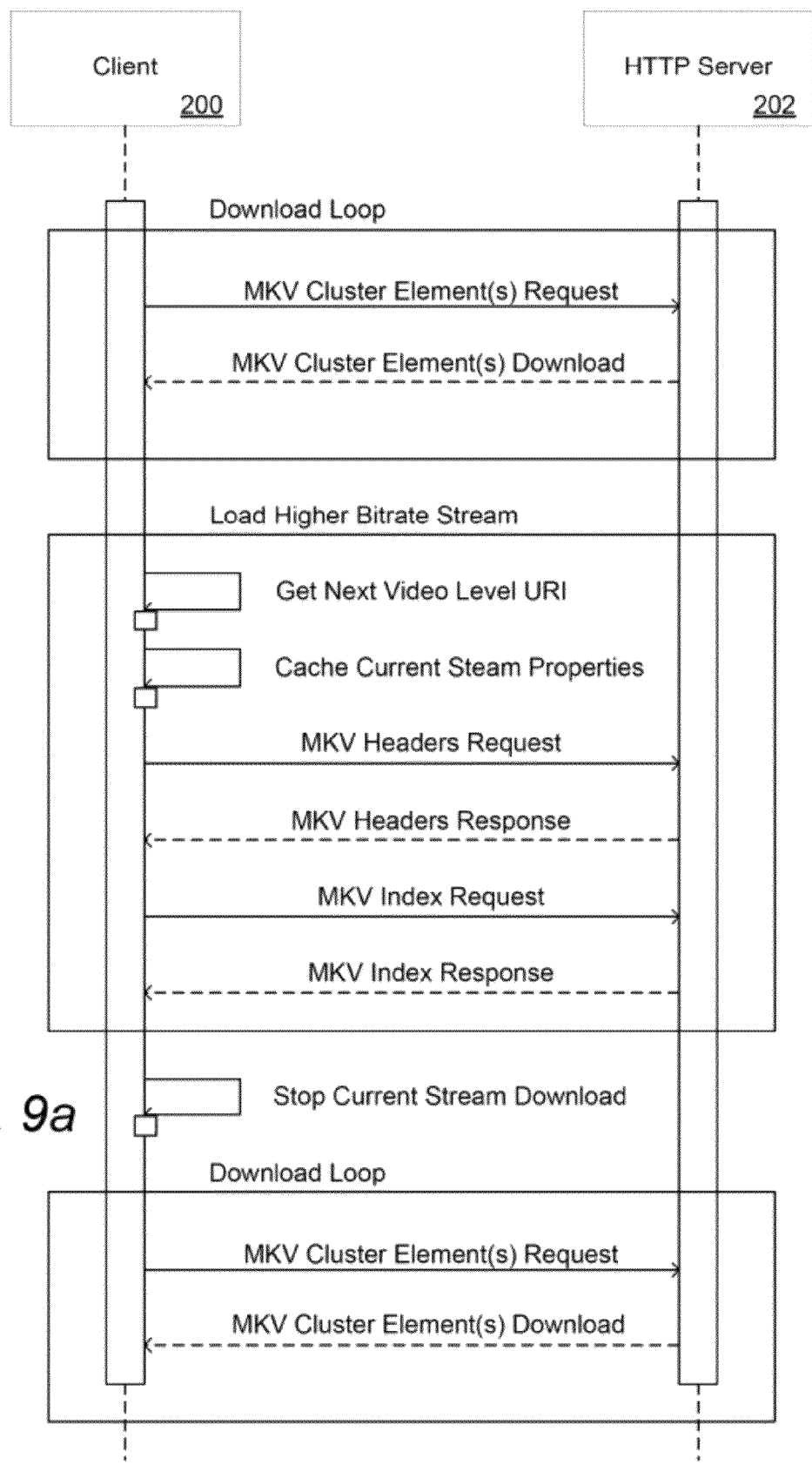
FIGS. 9a and 9b conceptually illustrate communication between a playback device and an HTTP server associated with switching between streams in response to the streaming conditions experienced by the playback device and depending upon the index information available to the playback device prior to the decision to switch streams in accordance with embodiments of the invention.

Communication between a playback device and a server when a playback device switches to a new stream in accordance with embodiments of the invention are illustrated in FIG. 9*a*. The communications illustrated in FIG. 9*a* assume that the index information for the new stream has not been previously requested by the playback device and that downloading of Cluster elements from the old stream proceeds while information is obtained concerning the Matroska container file containing the new stream. When the playback device 200 detects a change in streaming conditions, determines that a higher bitrate stream can be utilized at the present streaming conditions, or receives a trick play instruction from a user, the playback device can use the top level index file to identify the URI for a more appropriate alternative stream to at least one of the video, audio, or subtitle streams from which the playback device is currently requesting encoded media. The playback device can save the information concerning the current stream(s) and can request the byte ranges of the headers for the Matroska container file(s) containing the new stream(s) using the parameters of the corresponding URIs. Caching the information in this way can be beneficial when the playback device attempts to adapt the bitrate of the stream downward. When the playback device experiences a reduction in available bandwidth, the playback device ideally will quickly switch to a lower bitrate stream. Due to the reduced bandwidth experienced by the playback device, the playback device is unlikely to have additional bandwidth to request header and index information. Ideally, the playback device utilizes all available bandwidth to download already requested higher rate Cluster elements and uses locally cached index information to start requesting Cluster elements from Matroska container file(s) containing lower bitrate stream(s).

Byte ranges for index information for the Matroska container file(s) containing the new stream(s) can be requested from the HTTP server 202 in a manner similar to that outlined above with respect to FIG. 8. At which point, the playback device can stop downloading of cluster elements from the previous streams and can commence requesting the byte ranges of the appropriate Cluster elements from the Matroska container file(s) containing the new stream(s) from the HTTP server, using the index information from the Matroska container file(s) to identify the Cluster element(s) containing the encoded media following the encoded media in the last Cluster element retrieved by the playback device. As noted above, the smooth transition from one stream to another is facilitated by encoding each of the alternative streams so that corresponding Cluster elements start with the same Timecode element and an IDR frame.

Figure 9B:
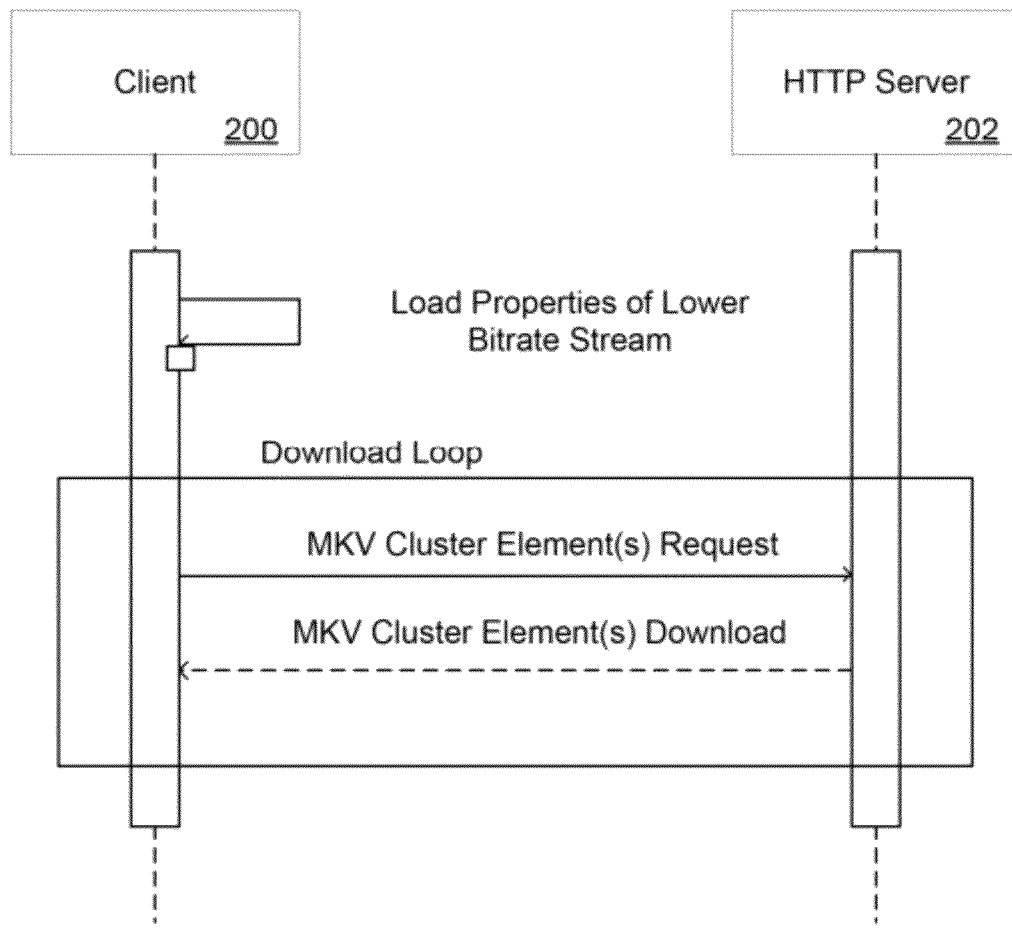

When the playback device caches the header and the entire index for each stream that has be utilized in the playback of the media, the process of switching back to a previously used stream can be simplified. The playback device already has the header and index information for the Matroska file containing the previously utilized stream and the playback device can simply use this information to start requesting Cluster elements from the Matroska container file of the previously utilized stream via HTTP. Communication between a playback device and an HTTP server when switching back to a stream(s) for which the playback device has cached header and index information in accordance with an embodiment of the invention is illustrated in FIG. 9*b*. The process illustrated in FIG. 9*b* is ideally performed when adapting bitrate downwards, because a reduction in available resources can be exacerbated by a need to download index information in addition to media. The likelihood of interruption to playback is reduced by increasing the speed with which the playback device can switch between streams and reducing the amount of overhead data downloaded to achieve the switch.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method of encoding source media including a subtitle track as a plurality of alternative video streams and a subtitle stream using a source encoder wherein the subtitle track is textually encoded, the method comprising:
 selecting a portion of the source media using the source encoder;
 transcoding the selected portion of the source media into a plurality of alternative portions of encoded video using the source encoder, where each alternative portion is encoded using a different set of encoding parameters and commences with an intra frame at the start of a closed group of pictures (GOP);
 writing each of the plurality of alternative portions of the selected portion of encoded video to a separate one of a plurality of container files using the source encoder;
 writing a subtitle stream segment from the subtitle track corresponding to the selected portion of the source media to a separate one of the plurality container files using the source encoder;
 associating a font file with the one of the plurality of container files containing subtitle stream segments wherein the font file includes information for representing the encoded text of the stream segment;
 attaching the font file to the associated one of the plurality of container files; and
 including a separate element in the one of the plurality of container files that includes metadata describing the font file.

2. The method of claim 1, further comprising compressing the font file.

3. The method of claim 1, further comprising reducing the size of the font file by subsetting the font file, where the subsetted font file includes all of the characters within the subtitle stream segments within the one of the plurality of container files with which the font file is associated.

4. The method of claim 1 further comprising breaking the font file into a plurality of font files, where each of the plurality of the font files includes characters displayed during a particular subtitle stream segment.

5. The method of claim 4, wherein breaking the font file into a plurality of font files comprises generating font files corresponding to different subtitle stream segments.

6. The method of claim 5, wherein the plurality of font files is assembled as attachments to a single container file.

7. The method of claim 5, wherein starting and ending timecodes are used to indicate a time period over which each of the plurality of font files is used for rendering subtitles.

8. The method of claim 5, further comprising generating a union font file using the plurality of font files that includes characters that appear in at least two of the plurality of font files and subsetting the plurality of font files to remove the characters that are in the union font file.

9. The method of claim 5, further comprising subsetting each plurality of font files so that characters used in previous subtitle stream segments are removed from the font file.

10. The method of claim 1, wherein the selected portions of source media are selected based upon their duration.

11. The method of claim 10, wherein the selected portions of source media each have a duration of two seconds.

12. The method of claim 1, wherein the container files containing the alternative video streams and the subtitle streams are Extensible Binary Markup Language (EBML) container files.

13. The method of claim 12, wherein:
 the element of the EBML container file to which each alternative portion of encoded video is written is a Cluster element; and
 each Cluster element to which each of the alternative portions of encoded video is written is assigned the same time code.

14. The method of claim 12, wherein the element of the EBML container file to which the subtitle stream segment is written is a Cluster element containing the same time code as the Cluster elements to which the alternative portions of encoded video are written.

15. The method of claim 1, further comprising creating a top level index file that identifies each of the container files containing the alternative portions of encoded video and identifies the container files that include the at least one subtitle stream.

16. The method of claim 1, wherein the metadata includes the location of the font file within the container file and information describing the file.

17. A source encoder configured to encode source media including a subtitle track as a plurality of alternative video streams and a subtitle stream encoder wherein the subtitle track is textually encoded, the source encoder comprising:
 a processor;
 instructions for directing the processor to:
  select a portion of the source media;
  transcode the selected portion of the source media into a plurality of alternative portions of encoded video, where each alternative portion is encoded using a different set of encoding parameters and commences with an intra frame at the start of a closed group of pictures (GOP);
  write each of the alternative portions of encoded video to a separate one of a plurality of container files using the source encoder;
  write a subtitle stream segment from each subtitle track corresponding to the selected portion of the source media to a separate one of the plurality of container files using the source encoder;
  associate a font file with the one of the plurality container files containing subtitle stream segments;
  attach the font file to the one of the plurality of container files containing the subtitle segments; and
  include a separate element in the one of the plurality of container files including the subtitle segments that includes metadata describing the attached font file; and
 a memory for storing instructions.

* * * * *